United States Patent
Xiao et al.

(10) Patent No.: US 11,063,648 B2
(45) Date of Patent: Jul. 13, 2021

(54) METHODS AND APPARATUS FOR FEEDING BACK AND RECEIVING CHANNEL STATE INFORMATION, AND DEVICE AND STORAGE MEDIUM

(71) Applicant: ZTE Corporation, Guangdong (CN)

(72) Inventors: Huahua Xiao, Guangdong (CN); Chuangxin Jiang, Guangdong (CN); Hao Wu, Guangdong (CN); Zhaohua Lu, Guangdong (CN); Bo Gao, Guangdong (CN); Yu Ngok Li, Guangdong (CN); Jianxing Cai, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/673,942

(22) Filed: Nov. 4, 2019

(65) Prior Publication Data

US 2020/0244329 A1 Jul. 30, 2020

Related U.S. Application Data

(63) Continuation of application No. PCT/CN2018/091053, filed on Jun. 13, 2018.

(30) Foreign Application Priority Data

May 5, 2017 (CN) .......................... 201710317504.X

(51) Int. Cl.
*H04B 7/0413* (2017.01)
*H04B 7/06* (2006.01)
*H04B 17/318* (2015.01)

(52) U.S. Cl.
CPC ......... *H04B 7/0626* (2013.01); *H04B 7/0413* (2013.01); *H04B 17/318* (2015.01)

(58) Field of Classification Search
CPC .. H04B 7/0617; H04B 17/318; H04B 7/0626; H04B 7/0632; H04B 7/0417;
(Continued)

(56) References Cited

U.S. PATENT DOCUMENTS

2014/0162717 A1* 6/2014 Liu ........................ H04L 5/0051
455/522
2018/0212718 A1 7/2018 Takeda et al.

FOREIGN PATENT DOCUMENTS

| CN | 102237958 A | 11/2011 |
| CN | 102625356 A | 8/2012 |

(Continued)

OTHER PUBLICATIONS

International Search Report and Written Opinion dated Aug. 22, 2018 for International Application No. PCT/CN2018/091053, filed on Jun. 13, 2018 (9 pages).

*Primary Examiner* — Rahel Guarino
(74) *Attorney, Agent, or Firm* — Perkins Coie LLP

(57) ABSTRACT

Methods and devices for channel state reporting in wireless communications are disclosed. In one example aspect, a method for wireless communication includes determining, by a user device, a first reference signal received power (RSRP) value. The first RSRP value is a maximum measured value of a RSRP group. The method also includes determining, by the user device, a second RSRP value based a differential of the first RSRP value and reporting the first RSRP value and the second RSRP value to a base station.

18 Claims, 9 Drawing Sheets

(58) Field of Classification Search
CPC .. H04B 17/336; H04B 7/0684; H04B 7/0641; H04W 72/042; H04W 72/046; H04W 72/121
See application file for complete search history.

(56) References Cited

FOREIGN PATENT DOCUMENTS

| | | |
|---|---|---|
| CN | 104508997 A | 4/2015 |
| CN | 105706376 A | 6/2016 |
| CN | 108111199 A | 6/2018 |
| WO | 2015094155 A1 | 6/2015 |
| WO | 2017/051846 A1 | 3/2017 |

\* cited by examiner

METHODS AND APPARATUS FOR FEEDING BACK AND RECEIVING CHANNEL STATE INFORMATION, AND DEVICE AND STORAGE MEDIUM

CROSS-REFERENCES TO RELATED APPLICATIONS

This patent document is a continuation of and claims the benefit of priority to International Patent Application No. PCT/CN2018/091053, filed on Jun. 13, 2018, which claims the benefit of priority of Chinese Patent Application No. 201710317504.X, filed on May 5, 2017. The entire contents of the before-mentioned patent applications are incorporated by reference as part of the disclosure of this application.

TECHNICAL FIELD

The present disclosure relates to the field of communications and, in particular, to a method and apparatus for feeding back channel state information, a method and apparatus for receiving channel state information, devices and storage media.

BACKGROUND

In wireless communication systems such as long term evolution (LTE) and new radio (NR), a first communication node and a second communication node generally perform transmission and reception by using multiple antennas to acquire a higher transmission rate. To take advantage of a multi-antenna system, the first communication node needs to know radio channel state information, so as to adjust a beam direction or a pre-coding weight value according to the radio channel state information, and adjust the modulation and coding scheme. How to guarantee accuracy of channel measurement and channel information feedback, rationality and robustness of feedback overhead is a hot research topic.

Channel state information (CSI) measurement and feedback are relatively simple in early protocols. With the development of technology, there is a higher requirement for obtaining high-precision CSI, and providing a higher-level CSI feedback at reasonable cost and in appropriate complexity is the goal pursued by the wireless communication system design.

With the development of multiple-input multiple-output (MIMO) computing, more and more kinds of CSI information need to be fed back. In addition to a channel quality indication (CQI)/a precoding matrix indicator (PMI)/a rank indicator (RI), the CSI information also includes a CSI-RS resource indicator (CRI). For the codebook, two types of CSI feedback are provided, i.e., CSI feedback type I and CSI feedback type II.

New first channel state information parameters are introduced, and new channel state information parameters may be introduced due to the enhancement of the CSI feedback type II. Priority relationships of these channel state information parameters include a priority relationship between newly introduced CSI parameters and CSI parameters in the original Release 13 and a priority relationship between the newly introduced CSI parameters. No effective solution has yet been proposed for the following problems: how to determine these priority relationships and how to determine a resource position for feeding back the CSI parameters according to these priority relationships for obtaining better performance, how to determine parameters to be preferentially fed back when conflicts occur, how to feed back some CSI parameters such as a reference signal received power on limited resources, and how to determine the relationship between the CSI parameters and parameters of a control channel in addition to the CSI parameters occur.

SUMMARY

Embodiments of the present disclosure provide a channel state information transmission method and apparatus, a device and a storage medium. A priority relationship between newly introduced CSI parameters and CSI parameters in the original Release 13 and a priority relationship among the newly introduced CSI parameters are determined, and a time-frequency resource position for feeding back the CSI parameter is determined according to these priority relationships, thereby improving accuracy of channel state information transmission, and further improving system performance.

Technical solutions of the present disclosure are implemented as follows.

In a first aspect, the embodiments of the present disclosure provide a method for feeding back channel state information. The method includes:
determining a priority of a channel state information (CSI) parameter in a CSI parameter set;
determining, according to the priority of the CSI parameter, a CSI parameter to be fed back and a time-frequency resource position for feeding back the CSI parameter;
feeding back the CSI parameter to be fed back on the time-frequency resource position.

In a second aspect, the embodiments of the present disclosure provide a method for receiving CSI. The method includes:
determining a priority of a CSI parameter in a CSI parameter set;
determining, according to the priority of the CSI parameter, a CSI parameter transmitted by a second communication node and a time-frequency resource position where the second communication node transmits the CSI parameter; and
receiving, on the time-frequency resource position, the CSI parameter transmitted by the second communication node.

In a third aspect, the embodiments of the present disclosure provide an apparatus for feeding back CSI. The apparatus includes:
a first determination module, which is configured to determine a priority of a CSI parameter in a CSI parameter set;
a second determination module, which is configured to determine, according to the priority of the CSI parameter, a CSI parameter to be fed back and a time-frequency resource position for feeding back the CSI parameter; and
a feedback module, which is configured to feed back the CSI parameter to be fed back on the time-frequency resource position.

In a fourth aspect, the embodiments of the present disclosure provide a second communication node. The second communication node at least includes: a processor and a storage medium storing executable instructions.

The processor is configured to execute the stored executable instructions, and the executable instructions include:
determining a priority of a CSI parameter in a CSI parameter set;
determining, according to the priority of the CSI parameter, a CSI parameter to be fed back and a time-frequency resource position for feeding back the CSI parameter; and feeding back the CSI parameter to be fed back on the time-frequency resource position.

In a fifth aspect, the embodiments of the present disclosure provide a computer storage medium, which is configured to store computer-executable instructions for executing the method for feeding back channel state information.

In a sixth aspect, the embodiments of the present disclosure provide an apparatus for receiving channel state information. The apparatus includes:

a third determination module, which is configured to determine a priority of a CSI parameter in a CSI parameter set;

a fourth determination module, which is configured to determine, according to the priority of the CSI parameter, a CSI parameter transmitted by a second communication node and a time-frequency resource position where the second communication node transmits the CSI parameter; and a reception module, which is configured to receive, on the time-frequency resource position, the CSI parameter transmitted by the second communication node.

In a seventh aspect, the embodiments of the present disclosure provide a first communication node, and the first communication node at least includes: a processor and a storage medium storing executable instructions.

The processor is configured to execute the stored executable instructions, and the executable instructions include:

determining a priority of a CSI parameter in a CSI parameter set;

determining, according to the priority of the CSI parameter, a CSI parameter transmitted by a second communication node and a time-frequency resource position where the second communication node transmits the CSI parameter; and receiving, on the time-frequency resource position, the CSI parameter transmitted by the second communication node.

In an eighth aspect, the embodiments of the present disclosure provide a computer storage medium, which is configured to store computer-executable instructions for executing the method for receiving channel state information.

The embodiments of the present disclosure provide a channel state information transmission method and apparatus, a second communication node and a storage medium. The priorities of the CSI parameters in the CSI parameter set are firstly determined, the CSI parameter to be fed back and the time-frequency resource position for feeding back the CSI parameter are determined according to the priorities of the CSI parameters, and the CSI parameter to be fed back is fed back on the time-frequency resource position. In this way, the priority relationship between newly introduced CSI parameters and CSI parameters related to the original Release 13 and the priority relationship of the newly introduced CSI parameters are determined, so that time-frequency resource position for feeding back the CSI parameters is determined according to these priority relationships, thereby improving accuracy of channel state information transmission and system performance.

BRIEF DESCRIPTION OF DRAWINGS

In the drawings (which are not necessarily drawn to scale), similar reference numerals in the drawings may denote similar components in different diagrams. The similar reference numerals having different letter suffixes may denote different examples of the similar components. The drawings generally illustrate various embodiments discussed in the present disclosure by way of example and not by way of limitation.

DETAILED DESCRIPTION

Figure 1:
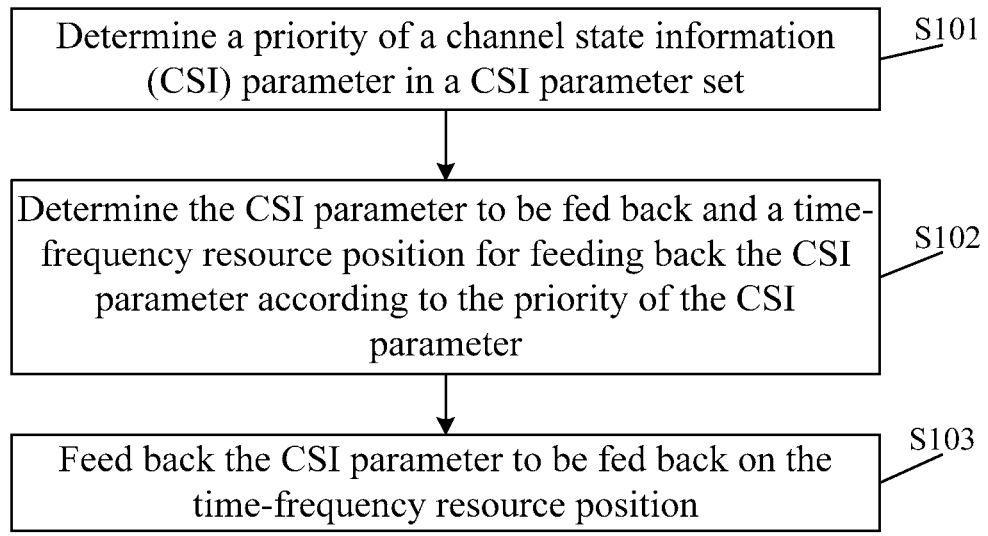
FIG. 1 is an implementation flowchart of a method for feeding back channel state information according to an embodiment of the present disclosure.

For a better understanding of embodiments of the present disclosure, some concepts and evolution processes of channel state information of 3rd generation partnership project (3GPP) RAN1 are illustrated below.

Channel state information mainly includes: CQI, PMI and RI. Herein, a CQI measured on an entire system bandwidth is referred to as a wide band CQI (WB CQI), and a CQI measured on a sub-band is referred to as a sub-band CQI (SB CQI). PMI has different representations according to different codebooks. Taking the LTE as an example, codebooks of Release 8 and Release 9 are single stage codebooks, the CSI to fed back only includes one precoding matrix index i; while an 8-antenna codebook of Release 10 and a 4-antenna codebook of Release 12 are 1-dimensional dual stage codebooks, including a first precoding matrix index i1 and a second precoding matrix index i2. A 2-dimensional dual stage codebook is introduced in Release 13. The first precoding matrix index includes a first-dimensional first precoding matrix index i11 (or a first index of the first precoding matrix) for indicating vector or vector group information of the first precoding matrix in the first dimension, a second-dimensional first precoding matrix index i12 (or a second index of the first precoding matrix) for indicating vector or vector group information of the first precoding matrix in the second dimension, and a second precoding matrix index i2. In Release 14, a linear combination codebook is introduced, i.e., each codeword in a codebook set is linearly combined by two vectors, thereby introducing a beam (which may be referred to as a precoding vector or a discrete Fourier vector) for combining multiple vectors, or beam group information, or index indication information of the beam, index indication information of the beam group, an offset of the beam group, an offset of the beam, which are collectively referred to as beam information of the linear combination codebook. A combined phase or phase indication information of the linear combination codebook are collectively referred to as phase information of linear combination codebook. Combined amplitude or power, an amplitude indication, or power indication of the linear combination codebook are collectively referred to as amplitude information of the linear combination codebook. Sometimes, one or more of the first precoding matrix index, the second precoding matrix index, the amplitude information of the linear combination codebook, the phase information of the linear combination codebook and the beam information of the linear combination codebook are referred to as a precoding matrix index. The index described in this disclosure is sometimes referred to as an indicator, an identifier, etc.

With the development of MIMO computing, more and more CSI information needs to be fed back. In addition to the CQI/PMI/RI, the CSI information also includes CSI-RS resource indicator (CRI). For the codebook, two types of CSI feedback also are provided.

CSI feedback type I mainly means that a codebook corresponding to the precoding matrix index included in the CSI is a legacy codebook, such as a codebook before Release 13 in the LTE, and the fed back content includes, but is not limited to, i, i1, i2, i11 and i12.

CSI feedback type II mainly means that codewords in the codebook set included in the CSI are codewords other than the CSI feedback type I, such as linearly combined codewords, each being obtained by linearly combining multiple beams, or a channel related matrix, an eigenvector corresponding to the channel related matrix, or mixed CSI feedback.

A channel state information parameter of the CSI feedback type I includes at least one of the following precoding matrix indexes: the precoding matrix index i, the first precoding matrix index i1, the second precoding matrix index i2, the first-dimensional first precoding matrix index i11, or the second-dimensional first precoding matrix index i12.

A channel state information parameter of the CSI feedback type II includes at least one of: beam index information, an offset of the beam index (here the offset is with respect to first group beam index information), amplitude information of a beam linear combination, phase information of the beam linear combination, power information of the beam linear combination, beam number information of the beam linear combination, offset information of an amplitude of the beam linear combination, phase offset information of the beam linear combination, channel related matrix information, feature value information of the channel related matrix, or eigenvector information of the channel related matrix.

In the NR, a weight value of the precoding may be adjusted at the baseband, beam information of the radio frequency may also be adjusted. Especially, in a high frequency (a carrier frequency is greater than 6G) system, multiple panels are used, and each panel includes elements arranged in multiple rows and columns, and the elements are virtualized into one or more of ports/radio transceiver units/antennas through radio frequency beams. The radio frequency beams may be managed according to changes of a radio channel. The beam management includes beam scanning, combined beam feedback, beam measurement and beam recovery, etc. New channel state information is introduced accordingly. Here, to distinguish from the original channel state information related to a baseband, channel state information related to the radio frequency beam management is referred to as a first type channel state information (including such as a radio frequency beam index indicator, a radio frequency beam group indicator, and a channel state information reference signal index indicator, and a reference signal received power (RSRP)), and the original channel state information (RI, PMI, CQI, CRI, channel state information corresponding to feedback type I, and channel state information corresponding to feedback type II) related to the baseband is referred to as a second type channel state information. It is to be noted that the radio frequency beams and pre-coded beams of the baseband in the feedback type I or the feedback type II are sometimes referred to as beams.

Here, first type channel state information has a channel state information reference signal index indication mainly used in a beam selection process in the radio frequency beam management. During the beam selection process, the first communication node configures N1 CSI-RS resources, and each CSI-RS resource pilot is transmitted by using one analog beam, a receiver measures channel quality, such as a RSRP, on the N1 CSI-RS resources, and selects a CSI-RS resource index (i.e. CRI) with a large RSRP for feedback, the first communication node determines the analog beam for data transmission based on the CRI fed back by the second communication node, and N1 is a positive integer greater than 1. Sometimes the second communication node also corresponds to multiple analog beams, and needs to select one from the multiple analog beams for signal reception. In this case, the CRI may correspond to one beam pair, i.e., a transmitting beam and a receiving beam.

The second type channel state information also has a channel state information reference signal index indication mainly used for a beam selection in baseband precoding. When the number of baseband ports is relatively large, to reduce CSI-RS pilot overhead, a CSI-RS pilot port needs to be precoded to obtain a precoded CSI-RS. Different baseband precoding each correspond to one CSI-RS resource. The second communication node obtains multiple CSI through measuring the CSI-RS resource corresponding to the different baseband precoding, and selects one CSI-RS resource index according to the CSI (such as CQI). The first communication node knows which precoding matches the current channel according to the fed back CRI.

To facilitate distinguishing, the CRI in the first type CSI is referred to as CRI1, and the CRI in the second type CSI is referred to as CRI2.

To better understand some concepts and definitions in the embodiments of the present disclosure, common concepts, definitions, regulations and principles are introduced and described herein.

A frequency domain resource includes one of a subcarrier, a subcarrier group (for example, a physical resource block in the LTE includes 12 subcarriers, a physical resource block), and a subcarrier set (such as a sub-band in the LTE). The subcarrier group includes multiple subcarriers, and the subcarrier set includes multiple subcarrier groups. The feeding back of channel state information is performed generally based on a certain frequency domain granularity. Generally speaking, the smaller the frequency domain granularity used in feedback is, the more accurately expressed the channel quality is, but feedback overhead is correspondingly larger. Otherwise, the larger the frequency domain granularity used in feedback is, the worse the channel quantization is, but the feedback overhead is smaller. Therefore, in a wireless communication system, such as the LTE or the NR, 12 subcarriers in the frequency domain are referred to as one physical resource block (PRB), and k physical resource blocks constitute one sub-band (SB), k is related to the system bandwidth. Of course, different standards may have different dividing modes, but in general, multiple physical resource blocks are included.

The first communication node needs to specify the bandwidth on which the second communication node measures the CSI and feeds back the measured CSI. The CSI measurement is performed with a certain frequency domain granularity, for example, wideband CSI is obtained through measuring based on a wideband, sub-band CSI is obtained through measuring based on a sub-band, and partial bandwidth CSI is obtained through measuring based on partial bandwidth, which may be referred to as frequency domain granularity of the CSI measurement. Feeding back the CSI measured based on the wideband is referred to wideband CSI feedback, CSI fed back by the wideband CSI feedback is measured based on the wideband. Feeding back the CSI measured based on the sub-band is referred to as sub-band CSI feedback, CSI fed back by the sub-band CSI feedback is measured based on one sub-band, and corresponds to one sub-band, which is referred to as a sub-band corresponding to the sub-band CSI feedback. Feeding back the CSI measured based on the partial bandwidth is referred to as partial bandwidth CSI feedback, CSI fed back by the partial bandwidth CSI feedback is measured based on one partial bandwidth, and the one partial bandwidth corresponds to one or more sub-bands, which are referred to as sub-bands included by the partial bandwidth corresponding to the partial bandwidth CSI feedback. Of course, there are different names in different protocols, but they are within the protection scope of the present disclosure as long as they have the same meaning.

The beams described in the embodiments of the present disclosure include a transmit beam, a receive beam, precoding, a precoding matrix, and a precoding matrix index. The beams may be a resource (such as precoding at a transmitting end, precoding at a receiving end, an antenna port, an antenna weight vector and an antenna weight matrix). A beam sequence number may be replaced with a resource index because the beam may be bound to some time-frequency code resources for transmission. The beam may also be in a transmission (transmitting/receiving) mode. The transmission mode may include spatial division multiplexing, frequency domain or time domain diversity and the like.

An indicator of a receive beam means that the transmitting end may indicate the receive beam through current reference signal(s) and antenna port(s) as well as an assumption on quasi-co-location (QCL) between the antenna port(s) and a reference signal (or base reference signal) fed back and reported by a UE. The receive beam refers to a beam of the receiving end which does not need to be indicated, or beam resources of the receiving end which are indicated by the transmitting end through the current reference signal (or base reference signal) and antenna port and the QCL between the antenna port and the reference signal (or base reference signal) fed back and reported by the UE.

The beam pair includes a combination of a transmit beam indicator and a receive beam indicator.

Some concepts such as CSI, CSI feedback, CSI measurement and the like are described herein.

CSI feeding back of the second communication node on the time domain mainly has three modes: periodic feedback, aperiodic feedback, and semi-persistent feedback.

The periodic feedback mainly is that the first communication node configures one period and an offset, the second communication node performs feedback according to multiple subframes corresponding to the period and the offset configured by the first communication node, such as in the LTE, the first communication node may configure the second communication node to perform measurement and quantization on channel information, and perform periodic feedback on the quantized CSI information through a physical uplink control channel (PUCCH).

The first communication node, when in need, may also aperiodically and suddenly trigger the second communication node to perform the CSI information, including the RI/PMI/CQI, where the CQI includes reporting of the WB CQI and the SB CQI, to overcome the problem that the periodic feedback does not have a high real-time characteristic and the CSI quantization accuracy is limited by the control channel overhead. The CSI information is only fed back on the subframe configured by the first communication node or the agreed subframe.

In addition, the semi-persistent CSI feedback is also included, which only occupies consecutive N>=1 feedback moments/periods/subframes of the periodic CSI feedback, being similar to the periodic CSI feedback. A start position and an end position of the feedback moments/periods/subframes may be activated or deactivated by higher layer signaling.

Channel state information measurement and feedback have two classes: Class A and Class B. The two classes use RRC signaling for semi-static configuration.

Class A: the first communication node sends a CSI-RS, which is generally a non-precoded pilot, and the user directly performs channel measurement and CSI quantization based on the CSI-RS pilot to obtain the RI/PMI/CQI. These contents are fed back on the PUCCH or PUSCH, and feedback contents are large, including a beam direction of the wideband.

Class B: the CSI-RS sent by the first communication node is generally a precoded pilot. The user may need to perform a precoded pilot selection first, and then perform quantization feedback of the channel information based on the selected CSI-RS pilot, including CSI-RS resource indicator (CRI) selection information, and RI/PMI/CQI information corresponding to a selected CSI-RS measurement resource subset.

Indicators of the various CSI parameters described in the present disclosure may also be referred to as index(es), and they are completely equivalent concepts, for example, the precoding matrix indicator may also be referred to as a precoding matrix index, the channel rank indicator may also be referred to as a channel rank index, and the beam group indicator may also be referred to as a beam group index.

The feeding back of the channel state information (or a parameter of the channel state information) described in the embodiments of the present disclosure means transmitting the channel state information (or a parameter of the channel state information), or sending the channel state information (or a parameter of channel state information).

The orthogonal cover code (OCC) is a set of orthogonal code sequences used for distinguishing different ports, the second communication node and the antenna in a code domain.

Hybrid ARQ includes two states. When the first communication node or the second communication node receives data successfully, an acknowledgement (ACK) is fed back; otherwise, a negative acknowledgement (NACK) is fed back.

A scheduling request (SR) is used for informing the first communication node that it has data to be transmitted and the first communication node needs to allocate uplink resources for it. A buffer status report is used for informing the first communication node the data transmission needs how many caches.

The symbol described in the present disclosure refers to a subframe, a frame, or a time unit in a slot, such as an OFDMA symbol in the LTE or the NR, an OFDM symbol, an SC-FDM symbol and the like.

Objects, solutions and advantages of the present disclosure will be more apparent from the description of the present disclosure in conjunction with drawings in the embodiments. The embodiments described below are intended to explain and not to limit the scope of the present disclosure.

Embodiment One

An embodiment of the present disclosure provides a method for feeding back channel state information. FIG. 1 is an implementation flowchart of the method for feeding back channel state information according to an embodiment of the present disclosure. As shown in FIG. 1, the method includes steps described below.

In step S101, a priority of a channel state information (CSI) parameter in a CSI parameter set is determined.

Here, the step S101 in which the priority of the CSI parameter in the CSI parameter set is determined may be implemented by a second communication node. In the embodiment of the present disclosure or other embodiments of the present disclosure, the second communication node includes, but is not limited to, various receiving devices such as a data card, a mobile phone, a laptop computer, a personal computer, a tablet computer, a personal digital assistant and a Bluetooth.

A first communication node includes, but is not limited to, a macro base station, a micro base station, a pico base station, a home base station, a transmission node, and a wireless hotspot.

It is to be noted that, in the downlink, the first communication node may be exemplified as a base station, and the second communication node may be exemplified as a terminal or a user in the embodiment of the present disclosure. But the method in the present disclosure may also be extended to the uplink. In this case, the first communication node may include various receiving devices such as a data card, a mobile phone, a laptop computer, a personal computer, a tablet computer, a personal digital assistant and a Bluetooth, and the second communication node include various base stations such as a macro base station, a micro base station, a pico base station, a home base station, a transmission node, and a wireless hotspot.

It is to be noted that the first communication node may include various mobile terminals, communication terminals in protocols such as Internet of Things, device-to-device, and car-to-car.

In step S102, a CSI parameter to be fed back and a time-frequency resource position for feeding back the CSI parameter are determined according to the priority of the CSI parameter.

Here, the CSI parameter to be fed back is the CSI parameter to be fed back to the first communication node. Since the second communication node can only transmit one CSI parameter or a CSI parameter set including a group of CSI parameters in one uplink subframe, so that the CSI parameter to be fed back and the time-frequency resource position for feeding back the CSI parameter are determined according to the priority of the CSI parameter. When a CSI parameter set is fed back to the first communication node, each CSI parameter in the CSI parameter set needs to be determined.

In step S103, the CSI parameter is fed back on the time-frequency resource position.

In the embodiment of the present disclosure, the CSI parameter includes at least one of: a first-type CSI parameter or a second-type CSI parameter.

The first-type CSI parameter includes at least one of: a reference signal received power (RSRP), a first-type channel state information reference signal resource indicator CRI1, a beam group index, a beam index, a port group index, a first-level RSRP, or a second-level RSRP.

The second-type CSI parameter includes at least one of: a channel rank indicator (RI), a second-type channel state information reference signal resource indicator CRI2, a precoding matrix index, a wideband channel quality indicator (WB CQI), a sub-band channel quality indicator (SB CQI), a first precoding matrix index, a second precoding matrix index, beam information of a linear combination codebook, phase information of the linear combination codebook, or amplitude information of the linear combination codebook.

In other embodiments of the present disclosure, before the step S101 in which the priority of the CSI parameter in the CSI parameter set is determined, the method further includes: acquiring the CSI parameter included in the CSI parameter set through receiving higher layer signaling configured by the first communication node.

In other embodiments of the present disclosure, the step S101 in which the priority of the CSI parameter in the CSI parameter set is determined may be implemented by the following three manners.

A first manner: a priority of a CSI parameter requested by the first communication node for feedback is determined automatically according to a preset rule.

That is: the second communication node automatically determines the priority of the CSI parameter requested by the first communication node for feedback. The second communication node then transmits the priority of the CSI parameter determined by the second communication node to the first communication node through higher layer and/or physical layer signaling carrying a priority relationship. Correspondingly, the first communication node acquires the priority of the CSI parameter through receiving the higher layer and/or physical layer signaling which is transmitted by the second communication node and carries the priority relationship, and determines that the priority of the CSI parameter is a priority of a CSI parameter on the first communication node side.

In other embodiments of the present disclosure, the priority determined by the second communication node is as follows:

A.1) The CSI parameter only includes a first type CSI parameter, the priority determined by the second communication node according to the preset rule is as follows:

a priority of the beam group index is not lower than a priority of any one of the RSRP, the port index, the beam index, the first-level RSRP and the second-level RSRP;

a priority of the CRI1 is not lower than the priority of any one of the RSRP, the port index, the beam index, the first-level RSRP and the second-level RSRP;

the priority of the first-level RSRP is higher than the priority of the second-level RSRP;

a priority of a first-type beam group having an index value i is higher than a priority of a first-type beam group having an index value i+1, where i is a natural number not less than 1;

a priority of the port index is not lower than the priority of any one of the beam index, the RSRP, the first-level RSRP and the second-level RSRP; and a priority of the beam index is not lower than the priority of any one of the RSRP, the first-level RSRP and the second-level RSRP.

A.2) The CSI parameter only includes a second-type CSI parameter, the priority determined by the second communication node according to the preset rule is as follows:

a priority of the CRI2 is not lower than a priority of the RI;

the priority of the RI is higher than a priority of any one of the precoding matrix index and a channel quality information index;

the priority of the RI is not lower than a priority of the first precoding matrix index;

the priority of the precoding matrix index is not lower than the priority of the channel quality information index;

the priority of the first precoding matrix index is higher than a priority of any one of the second precoding matrix index, beam group information of the linear combination codebook, the phase information of the linear combination codebook and the amplitude information of the linear combination codebook;

the priority of the second precoding matrix index is not higher than the priority of any one of the beam group information of the linear combination codebook, the amplitude information of the linear combination codebook and the phase information of the linear combination codebook;

the priority of the beam information of the linear combination codebook is not lower than the priority of any one of the amplitude information of the linear combination codebook and the phase information of the linear combination codebook;

the priority of the amplitude information of the linear combination codebook is not lower than the priority of the phase information of the linear combination codebook;

the priorities of the beam information of the linear combination codebook, the phase information of the linear combination codebook and the amplitude information of the linear combination codebook are not less than a priority of any one of the wideband channel quality indicator and the sub-band channel quality indicator.

A.3) the CSI parameter includes the first type CSI parameters and the second-type CSI parameters, and the second communication node determines that the priority of first type CSI parameter is higher than the priority of the second-type CSI parameter according to the preset rule. The priority relationship of the first-type CSI parameters is the same as that specified in A.1), and the priority relationship of the second-type CSI parameters is the same as that specified in A.2).

That is, the priority of any parameter of the first-type CSI parameters is higher than the priority of any parameter of the second-type CSI parameters; or The priority of the second-level RSRP is not higher than the priority of any parameter of the second-type CSI parameters, and the priority of any parameter of the first-type CSI parameters other than the second-level RSRP is higher than the priority of any parameter of the second-type CSI parameters.

A second manner: the priority of the CSI parameter is determined according to received higher layer signal and/or physical layer signaling carrying a priority relationship.

Here, the second communication node determines the priority of the CSI parameter through receiving the higher layer signal and/or physical layer signaling carrying a priority relationship sent by the first communication node. That is, the first communication node determines the priority of the CSI parameter according to the preset rule, and then sends the priority of the CSI parameter which is determined automatically by the first communication node and carried in the higher layer and/or physical layer signaling to the second communication node. The second communication node parses the higher layer and/or physical layer signaling to acquire the priority of the CSI parameter.

It is to be noted that the preset rule used by the first communication node to automatically determines the priority of the CSI parameter is the same as the preset rule used in determining the priority relationships specified in A.1), A.2) and A.3) in the first mode.

A third mode: the priority of the CSI parameter is determined according to the preset rule pre-agreed by the second communication node and the first communication node.

Here, the preset rule appointed by the first communication node and the second communication node for determining the priority is the same as the preset rule used in determining the priority relationships specified in A.1), A.2) and A.3) in the first mode.

In other embodiments of the present disclosure, the priority may be configured according to a degree of delay sensitivity of the CSI parameter, for example, the CSI parameter whose delay sensitivity degree is higher has a higher priority. The priority may be configured according to the importance of the CSI parameter, for example, the CSI parameter which is more important has a higher priority. In practical applications, the priority of the CSI parameter such as the channel rank, the beam index and the CRI is relatively high. The priority may be determined according to the scheduling order of the CSI parameter, and the CSI parameter that is preferentially transmitted when conflicts occur has a higher priority.

In the actual implementation process, determining the CSI parameter to be fed back according to the priority of the CSI parameter may be implemented by the following steps:

The parameters in the CSI parameter set are divided into C1 CSI parameter subsets.

From these CSI parameter subsets, C2 CSI parameter subsets having highest priorities are determined as a set of CSI parameters to be fed back. The priority of the CSI parameter subset is determined by the priority of the CSI parameter having the highest CSI priority in the CSI parameter subset. C1 and C2 are positive integers, and C2 is less than and equal to C1, the CSI parameters to be fed back are part or all of CSI parameters in the CSI parameter set.

To better understand how to determine the CSI parameters to be fed back according to the priority of the CSI parameter, the embodiment of the present disclosure illustrates how to determine a conflict problem of the CSI parameters according to the priority of the CSI parameter in the case of a PUCCH or semi-persistent feedback.

The second communication node measures the pilot through a channel, such as a CSI-RS and/or measures the pilot through interference, such as a zero-power CSI-RS, and obtains the CSI parameter set through these measurements. The CSI parameter set, for example, includes the RI, the CRI2, the first precoding matrix i1, the second precoding matrix i2, and the WB CQI. Of course, the CSI parameter set may also include other CSI parameters: the first type CSI parameter CRI1 and the RSRP. Herein, other CSI parameters are not listed in detail.

The second communication node determines that the priority of the CRI is not lower than the priority of the RI, the priority of the RI is higher than i1, the priority of i2 is higher than the WB CQI, the priority of i1 is higher than i2, and the priority of CRI1 is higher than that of the RSRP. The priority of the RSRP is higher than the CRI2, i.e., CRI1>RSRP>CRI2>=RI>i1>i2>WB CQI. Here, > denotes that the CSI parameter on the left has a higher priority than the CSI parameter on the right, and "=" denotes that two CSI parameters have the same priority.

The second communication node can only transmit one CSI parameter or a group of CSI parameters in one uplink subframe. The content reported each time is referred to as a report type, such as a report type in the LTE. One report type includes one or more CSI parameters, for example, a report type 1 is the CRI, a report type 2 is the RI, and a report type 3 is {CRI, RI}.

A report type 4 is {RI, i1}, a report type 5 is {i2, WB CQI}, a report type 6 is {CRI1}, and a report type 7 is {RSRP}. Here, a report type index not necessarily one-to-one corresponds to a specific protocol (such as the LTE), and is only an example. The report type does not necessarily include report type 1~report type 5, and may also include other report types. Moreover, when one report type includes multiple CSI parameters, the priority of the report type is determined by the CSI parameter with the highest priority in the report type, for example, the priority of the report type 4 is the same as that of the RI, and the priority of the report type 5 is the same as that of i2

In the periodic or semi-persistent feedback, it is assumed that the report type is fed back in a period of 5 ms. In one subframe, the RI and WB CQI+i2 need to be transmitted on this subframe, and the second communication node first determines to transmit the report type 2 including the RI, and then transmits the report type 5 when a next period arrives.

If the CRI1 and the RI collide, i.e., both the report type 6 and the report type 2 need to be transmitted on the same subframe, the second communication node determines that the report type corresponding to the CRI1 is preferentially fed back.

Similarly, the first communication node may also learn that the CSI parameter selected to report by the second communication node is a CSI parameter with a higher priority according to the priority of the CSI parameter.

In other embodiments of the present disclosure, determining the time-frequency resource position of the CSI parameter to be fed back according to the priority of the CSI parameter includes:

determining the time-frequency resource position of the CSI parameter according to first signaling sent by a first communication node and the priority of the CSI parameter to be fed back, where the first signaling includes physical layer signaling and/or higher layer signaling. The first signaling at least carries one of:

a demodulation reference signal (DMRS) pattern, a number of Layers, a multiple-input multiple-output (MIMO) mode, a time unit structure, a subcarrier type, a system bandwidth size, a carrier frequency modulation mode, a number of symbols occupied by a DMRS, a start position of a data shared channel, a sending time length of the data shared channel, or an orthogonal cover code (OCC) of the DMRS.

It is to be noted that, unless otherwise stated, which CSI parameters are included the CSI parameter in the embodiment of the present disclosure and other embodiments of the present disclosure including is not limited, for example, one or more CSI parameters in the first type CSI parameter may be the CRI1 and/or the RSRP, one or more CSI parameters in the second type CSI parameter may be the RI and/or the PMI and/or the CQI. Which CSI parameters are included in the CSI parameter in the embodiment of the present disclosure and other embodiments of the present disclosure may be configured by the first communication node through the higher layer signaling. The second communication node obtains relevant CSI parameters through receiving a CSI parameter configuration in the higher layer signaling and according to a channel measurement pilot and/or an interference measurement pilot. Of course, the CSI parameter in the embodiment of the present disclosure and other embodiments of the present disclosure may also be a set agreed by the first communication node and the second communication node. For example, when no higher layer signaling configuration is provided, which CSI parameters need to be fed back are configured by default. Such agreement may be related to an MIMO mode, for example, feeding back which CSI parameters in an open-loop MIMO, feeding back which CSI parameters in a closed-loop MIMO, feeding back which CSI parameters in a semi-static open-loop MIMO. The agreement may be related to the number of antennas, for example, which CSI parameters need to be fed back with 4 antennas, and which CSI parameters need to be fed back with 8 antennas. The agreement may also be related to a transmission mode, for example, which CSI parameters need to be fed back in a respective one of transmission modes 1 to 10 in the LTE.

In the embodiment of the present disclosure, the priority of the CSI parameter in the CSI parameter set is firstly determined, the CSI parameter to be fed back and the time-frequency resource position for feeding back the CSI parameter is determined according to the priority of the CSI parameter, and the CSI parameter to be fed back is fed back on the time-frequency resource position. In this way, the priority relationship between newly introduced CSI parameters and CSI parameters related to the original Release 13 and the priority relationship of the newly introduced CSI parameters are determined, so that time-frequency resource position for feeding back the CSI parameters is determined according to these priority relationships, thereby improving accuracy of channel state information transmission and system performance.

Embodiment Two

Based on the above embodiments, the embodiment of the present disclosure further provides an implementation method of the step of determining the time-frequency resource position of the CSI parameter to be fed back according to the priority of the CSI parameter to be fed back in the method for feeding back channel state information. In the embodiment and other embodiments of the present disclosure, determining the time-frequency resource position of the CSI parameter may also be described into CSI parameter mapping, the CSI parameter mapping means to modulate a modulation symbol corresponding to the CSI parameter on a resource element (RE) for transmitting the CSI parameter.

Different DMRS patterns correspond to different CSI parameter mappings. Generally speaking, following rules I) and II) are provided.

rule I): for a same carrier, if N1<N2, a priority of a CSI parameter on an ith symbol is not lower than a priority of a CSI parameter on a jth symbol; if N1>N2, the priority of the CSI parameter on the ith symbol is not higher than the priority of the CSI parameter on the jth symbol; if N1=N2 and i<j, the priority of the CSI parameter on the ith symbol is not lower than the priority of the CSI parameter on the jth symbol; if N1=N2 and i>j, the priority of the CSI parameter on the ith symbol is not higher than the priority of the CSI parameter on the jth symbol.

N1 is a minimum value of a first index difference set, the first index difference set is composed of absolute values of differences between the symbol index of the ith symbol and symbol indexes of Nd symbols where the DMRS is located; N2 is a minimum value of a second index difference set, the second index difference set is composed of absolute values of differences between the symbol index of the jth symbol and symbol indexes of the Nd symbols where the DMRS is located, i and j are non-negative integers less than Ns, Nd is a positive integer less than Ns, and Ns is the number of symbols in one subframe. That is, N1=min(|k−i|) and N2=min (|k−j|). i, k, j are non-negative integers smaller than Ns, k is one or more symbol indexes of the symbols where the DMRS is located, |c| denotes an absolute value of c, and min(C) denotes a minimum value of a C set.

and/or rule II): for different carriers on a same symbol, a priority of a CSI parameter transmitted on an m1-th carrier is not lower than that of a CSI parameter transmitted on an m2-th carrier, where m1<m2, and m1 and m2 are positive integers.

In the rule I) and rule II), the following needs to be noted. 1) when N1 or N2 is 0, the CSI parameter on the ith symbol or the jth symbol and the symbol where the DMRS is located are on a same symbol, i.e., as shown in FIGS. 3a~3g, the DMRS is discrete on the frequency domain. 2) it is assumed that the index of the symbol where the DMRS is located is k. If the symbol (k−1) or the symbol (k+1) is a physical downlink control channel (PDCCH) or a guard period (GP) or a PUCCH, and then the (k−1)th symbol or (k−1)th symbols do not map or transmit the CSI parameter. 3) If the symbol of the CSI parameter is the same as the index of the symbol in which the DMRS is located, the carrier in which the DMRS is located cannot map the CSI parameter. 4) A carrier for transmitting the DMRS, a CSI-RS, a sounding reference signal and a synchronization signal is not used for transmitting the CSI parameter.

The rule I) and rule II) are described with reference to examples 1 to 4.

Example 1, the priority of the CSI parameter transmitted on the symbol where the DMRS is located is higher than the priority of a CSI parameter transmitted on the previous one symbol of the symbol where the DMRS is located or the next one symbol of the symbol where the DMRS is located.

Example 2, if the DMRS occupies multiple symbols, the priority of the CSI parameter transmitted on the N1th symbol of the DMRS is not lower than the priority of the CSI parameter transmitted by the N2th symbol of the DMRS, where N1<N2, and N1 and N2 are positive integers.

Example 3, the priority of the CSI parameter transmitted on the N3th one among the symbols not including the DMRS is not lower than the priority of the CSI parameter transmitted by the N4th one of the symbols not including the DMRS, N3<N4, and N3 and N4 are positive integers.

Example 4, the priority of the CSI parameter transmitted on an m1th carrier is not lower than the priority of the CSI parameter transmitted on an m2th carrier, where m1<m2, and m1 and m2 are positive integers.

In other embodiments of the present disclosure, the time-frequency resource position is a time-frequency resource position of the CSI parameter relative to a DMRS, the step of determining the time-frequency resource position of the CSI parameter to be fed back includes:

for any symbol k on which the DMRS is located, in response to determining that the DMRS is discrete on a frequency domain on the symbol k, according to a priority order of the CSI parameter, the CSI parameter is mapped according to an order of k, k−1, k+1, . . . , k−N1, k+N1, and in response to determining that a symbol with a symbol index of k−N1 is used for transmitting a downlink control channel or a guard period (GP), then symbols whose symbol indexes are less than k−N1 are not used for transmitting the CSI parameter; in response to determining that a symbol with a symbol index of k+N1 is used for transmitting an uplink control channel, then symbols whose symbol indexes are greater than k+N1 are not used for transmitting the CSI parameter, where N1 is a positive integer and less than Ns/2, and Ns is a number of symbols included in one subframe; or for any symbol k on which the DMRS is located, in response to determining that the DMRS occupies all sub-carriers on the frequency domain on the symbol k, according to the priority order of the CSI parameter, the CSI parameter is mapped according to an order of k−1, k+1, . . . , k−N1, k+N1, and in response to determining that a symbol with a symbol index of k−N1 is used for transmitting the downlink control channel or the GP, then symbols whose symbol indexes are less than k−N1 are not used for transmitting the CSI parameter; in response to determining that the symbol with the symbol index of k+N1 is used for transmitting the uplink control channel, then symbols whose symbol indexes are greater than k+N1 are not used for transmitting the CSI parameter, and the symbol used for transmitting the DMRS is not used for transmitting the CSI parameter; where N1 is a positive integer and less than Ns/2, and Ns is the number of symbols in one subframe.

In other embodiments of the present disclosure, the time-frequency resource position is the time-frequency resource position of the CSI parameter relative to the DMRS, for different DMRS patterns, the step of determining the time-frequency resource position of the CSI parameter according to the priority of the CSI parameter fed back to the first communication node further includes: determining a symbol ordered set for transmitting the CSI parameter according to the DMRS pattern, determining a mapping relationship between the CSI parameter to be fed back and symbols in the symbol ordered set for transmitting the CSI parameter according to the priority of the CSI parameter to be fed back, where an element index value in the ordered set corresponding to a CSI parameter having a higher priority is less than an element index value in the ordered set corresponding to a CSI parameter having a lower priority.

The first communication node or the second communication node obtains the symbol ordered set according to the DMR pattern. Each element in the ordered set is an index of a symbol, and elements in the ordered set are ordered based on the indexes of the elements. For example, an ordered set A=<a1, a2, a3, . . . , an>, a1 denotes the ith element of the ordered set, i=1, 2, 3, . . . , n. n is the number of elements of the ordered set A, its content is the index of the symbol, and the value range is 0~Ns. Ns is the number of symbols in one subframe, for example, for a subframe with a normal cyclic prefix in the LTE, the value of Ns is 14 symbols. The ordered set is sorted according to an order of the indexes i of the elements. The determination of the ordered set according to the DMRS is described with reference to the following several examples.

For a DMRS pattern in which the DMRS is only transmitted on the symbol k and the DMRS occupies the entire symbol, if the (k−1)th symbol is used for transmitting the physical downlink control channel (PDCCH) or the GP, the symbol ordered set is <k+1, k+2, k+3, . . . , Ns>, if the (k+1)th symbol is the physical uplink control channel (PUCCH), the symbol ordered set is <k−1, k−2, k−3, . . . , 0>; otherwise, the symbol ordered set is {k−1, k+1, k−2, k+2, k−3, k+3>.

For a DMRS pattern in which the DMRS is only transmitted on the symbol k and the DMRS is discrete on the frequency domain, if the (k−1)th symbol is used for transmitting the PDCCH or the GP, the symbol ordered set is <k, k+1, k+2, k+3, . . . , Ns>; if the (k+1)th symbol is the PUCCH, the symbol ordered set is <k, k−1, k−2, k−3, . . . , 0>; otherwise, the symbol ordered set is <k, k−1, k+1, k−2, k+2, k−3, k+3>.

For a DMRS pattern in which the DMRS is only transmitted on the symbols k1 and k2 and the DMRS occupies the entire symbols, if the (k1−1)th symbol is used for transmitting the PDCCH or the GP, the symbol ordered set is <k1+1, k2−1, k2+1, k1+2, k2−2, k2+2>, if the (k1−1)th symbol is used for transmitting the PDCCH or the GP and the (k2+1)th symbol is the PUCCH, the symbol ordered set is <k1+1, k2−1, k2+1, k1−2, k2−2, k2+2>; otherwise, the symbol ordered set is <k1−1, k1+1, k2−1, k2+1, k1−2, k1+2, k2−2, k2+2>.

For a DMRS pattern in which the DMRS is only transmitted on the symbols k1 and k2 and the DMRS is discrete on the frequency domain, if the (k1−1)th symbol is used for transmitting the PDCCH or the GP, the symbol ordered set is <k1, k1+1, k2−1, k2+1, k1+2, k2−2, k2+2>; if the (k1−1)th symbol is used for transmitting the PDCCH or the GP and the (k2+1)th symbol is the PUCCH, the symbol ordered set is <k1, k1+1, k2−1, k2+1, k1−2, k2−2, k2+2>; otherwise, the symbol ordered set is <k1, k1−1, k1+1, k2−1, k2+1, k1−2, k1+2, k2−2, k2+2>.

For a DMRS pattern in which the DMRS is only transmitted on the symbols k1, k2, k3 and k4 and the DMRS occupies the entire symbols, where k2=k1+1 and k4=k3+1, if the (k1−1)th symbol is a control channel or a symbol on which the GP is located, the symbol ordered set is <k2+1, k3−1, k4+1, k2+2, k3−2, k4+2>; if the (k4+1)th symbol is the PUCCH, the symbol ordered set is <k1−1, k2+1, k3−1, k1−2, k2+2, k3−2>; otherwise, the symbol ordered set is <k1−1, k2+1, k3−1, k4+1, k1−2, k2+2, k3−2, k4+2>.

For a DMRS pattern in which the DMRS is only transmitted on the symbols k1, k2, k3 and k4 and the DMRS is discrete on the frequency domain, and k2=k1+1 and k4=k3+1, if the (k1−1)th symbol is the PDCCH or the symbol on which the GP is located, the symbol ordered set is <k1, k2, k3, k4, k2+1, k3−1, k4+1, k2+2, k3−2, k4+2>; if the (k4+1)th symbol is the PUCCH, the symbol ordered set is <k1, k2, k3, k4, k1−1, k2+1, k3−1, k1−2, k2+2, k3−2>; otherwise, the symbol ordered set is <k1, k2, k3, k4, k1−1, k2+1, k3−1, k4+1, k1−2, k2+2, k3−2, k4+2>.

For a DMRS pattern in which the DMRS is only transmitted on the symbols k1, k2, k3 and k4 and the DMRS occupies the entire symbols, and k1, k2, k3 and k4 are discontinuous, if the (k1−1)th symbol is the PDCCH or the symbol on which the GP is located, the symbol ordered set is <k1+1, k2−1, k2+1, k3−1, k3+1, k4−1, k4+1>; if the (k4+1)th symbol is the PUCCH, the symbol ordered set is <k1+1, k2−1, k2+1, k3−1, k3+1, k4−1>; otherwise, the symbol ordered set is <k1−1, k1+1, k2−1, k2+1, k3−1, k3+1, k4−1, k4+1>.

For a DMRS pattern in which the DMRS is only transmitted on the symbols k1, k2, k3 and k4 and the DMRS occupies the entire symbols, and k1, k2, k3 and k4 are discontinuous, if the (k1−1)th symbol is the PDCCH or the symbol on which the GP is located, the symbol ordered set is <k1, k2, k3, k4, k1+1, k2−1, k2+1, k3−1, k3+1, k4−1, k4+1>; if the (k4+1)th symbol is the PUCCH, the symbol ordered set is <k1, k2, k3, k4, k1+1, k2−1, k2+1, k3−1, k3+1, k4−1>; otherwise, the symbol ordered set is <k1, k2, k3, k4, k1−1, k1+1, k2−1, k2+1, k3−1, k3+1, k4−1, k4+1>.

Here, the mapping relationships of some CSI parameters are described with reference to several DMRS patterns.

In this example, without loss of generality, the first communication node configures $N_{CSI}$=4 CSI parameters or a CSI parameter set that is jointly coded. Since the CSI parameter set is jointly encoded, the CSI parameter set can be taken as one CSI parameter, and the priority of the CSI parameter set is determined by the CSI with the highest priority in the CSI parameter set. The priorities of these $N_{CSI}$ CSI parameters are ordered in the following manner: a first priority CSI parameter (such as a first type CRI1), a second priority CSI parameter (such as the RI), a third priority CSI parameter (such as i11 and i12), a fourth priority CSI parameter (such as CQI and i2), the priority levels are relative levels among the CSI parameters to be fed back. Here, the content included in a ith priority CSI parameter may also be other CSI parameters, here is just an example, i=1, 2, 3, 4.

The symbol in the embodiment of the present disclosure denotes a time domain resource of a radio resource, which may be an orthogonal frequency division multiplexing (OFDM), single-carrier frequency division multiple access (SC-FDMA), or orthogonal frequency division multiple access (OFDMA).

The mapping process of the CSI parameter is described with reference to patterns as follow.

Figure 2A:
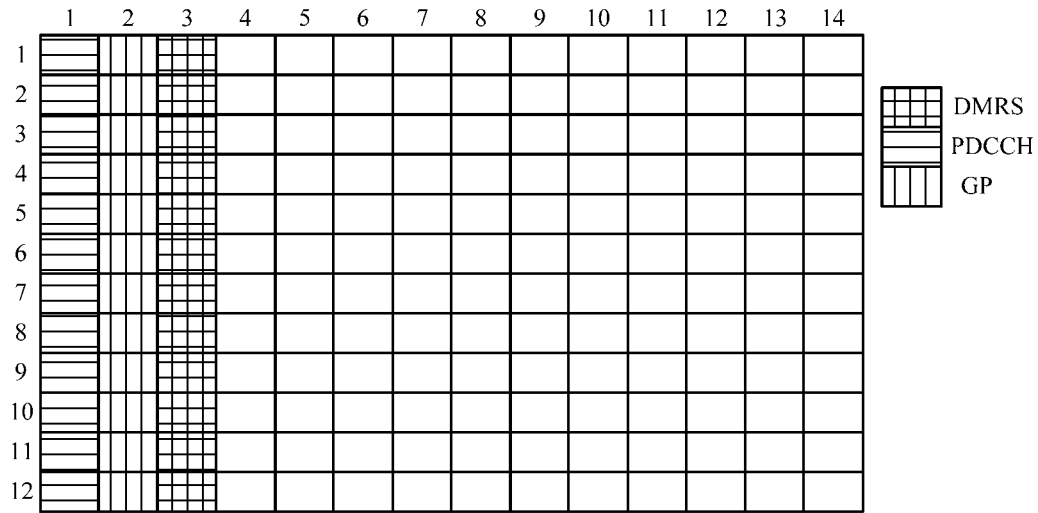
FIG. 2a is a schematic diagram of a DMRS pattern occupying a whole symbol according to an embodiment of the present disclosure.
Figure 2B:
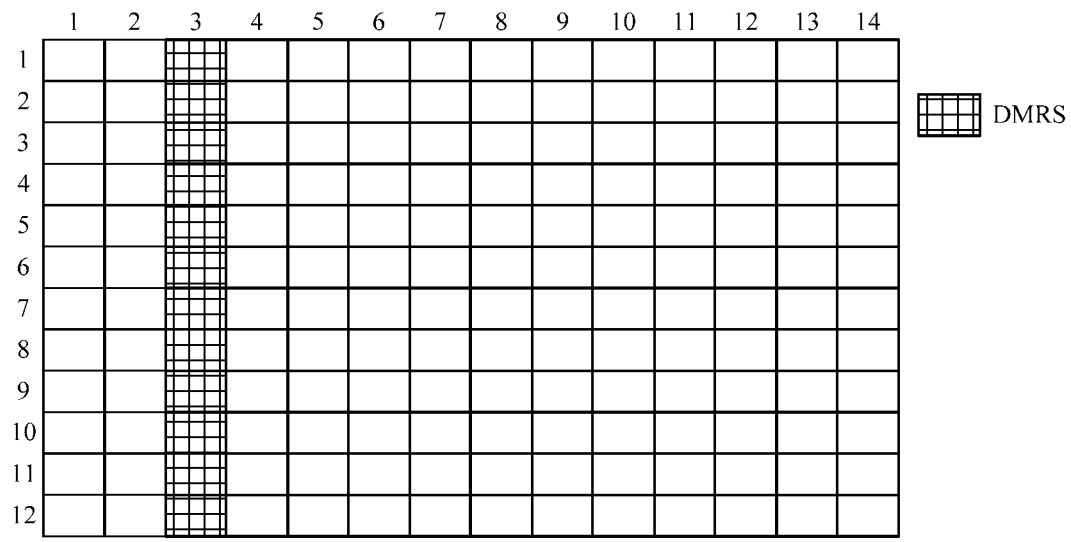
FIG. 2b is a schematic diagram of another DMRS pattern occupying a whole symbol according to an embodiment of the present disclosure.
Figure 2C:
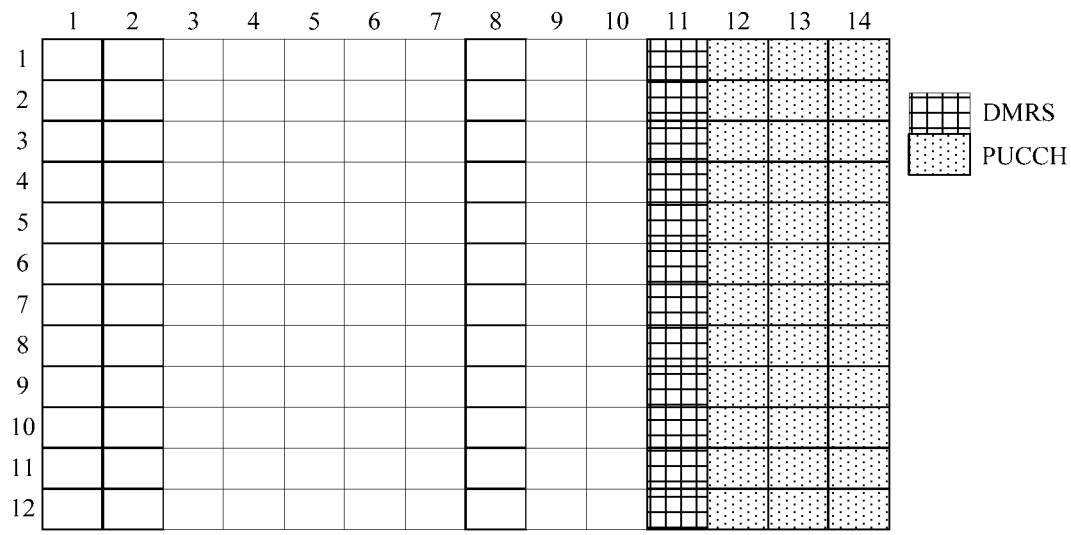
FIG. 2c is a schematic diagram of another DMRS pattern occupying a whole symbol according to an embodiment of the present disclosure.

DMRS Pattern 1: the DMRS is only on a kth OFDM symbol. As shown in FIGS. 2a to 2c, the DMRS consecutively occupies the entire symbol in the frequency domain.

In the DMRS pattern shown in FIG. 2a, a (k−1)th symbol is used for transmitting the PDCCH or the GP, and then the CSI parameter is mapped, from the highest priority to the lowest priority, on symbols, whose symbol indexes are greater than k. The mapping is performed one symbol by one symbol in an order of k+1, k+2, k+3, k+4.

In the DMRS pattern shown in FIG. 2b, none of the (k−1)th symbol and the (k+1)th symbol is used for transmitting the control channel, the PUCCH and the GP, so the CSI parameter is mapped on symbols one by one in an order of k−1, k+1, k−2, k−2 from the highest priority to the lowest priority.

In the DMRS pattern shown in FIG. 2c, the (k+1)th symbol is used for transmitting the PUCCH, and the CSI parameter is mapped on the symbols whose symbol indexes are less than k one by one, in an order of k−1, k−2, k−3, k−4, from the highest priority to the lowest priority. For the same symbol, the mapping is performed in the order of priority, from the lowest carrier index to the highest carrier index.

Figure 3A:
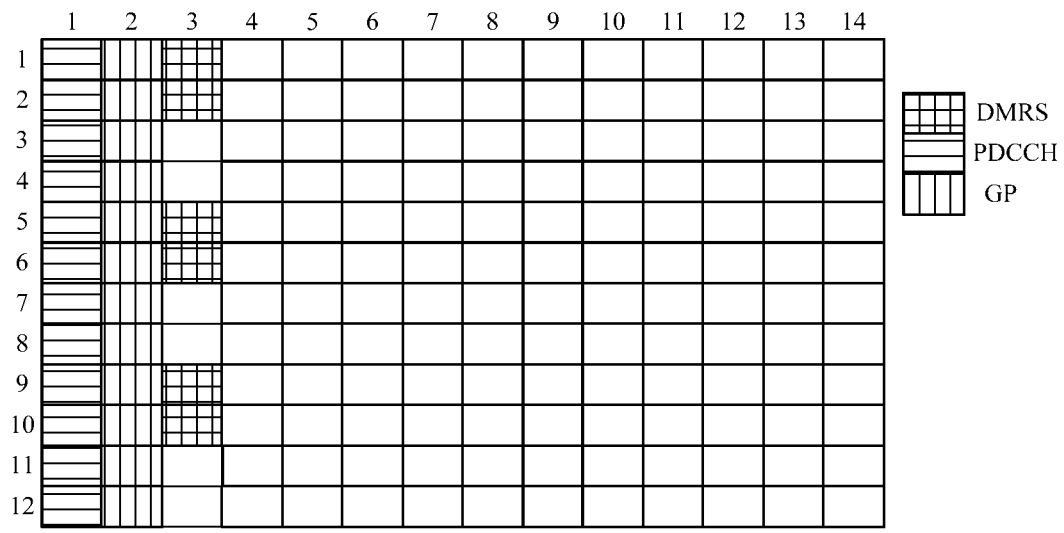
FIG. 3a is a schematic diagram of a DMRS pattern which is discrete on one symbol according to an embodiment of the present disclosure.
Figure 3B:
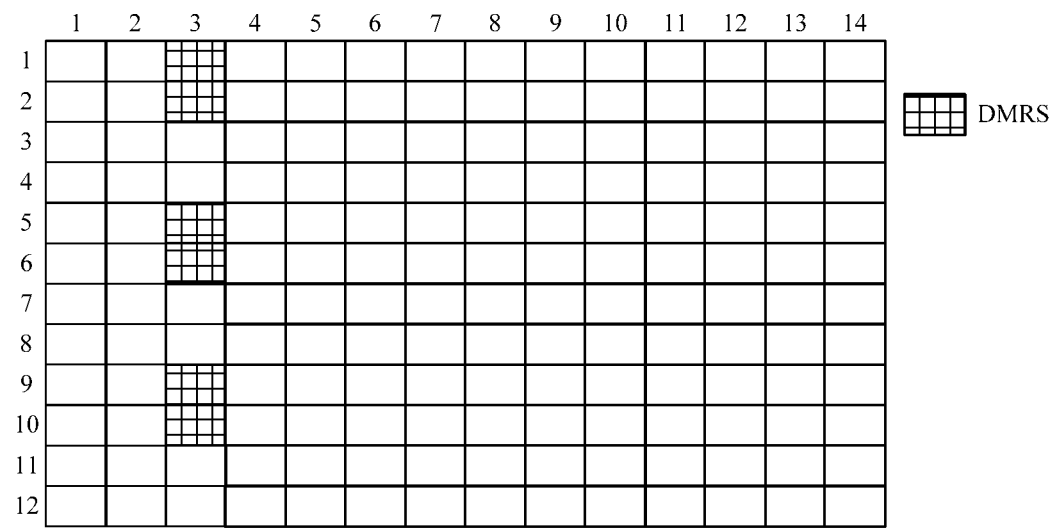
FIG. 3b is a schematic diagram of another DMRS pattern which is discrete on one symbol according to an embodiment of the present disclosure.
Figure 3C:
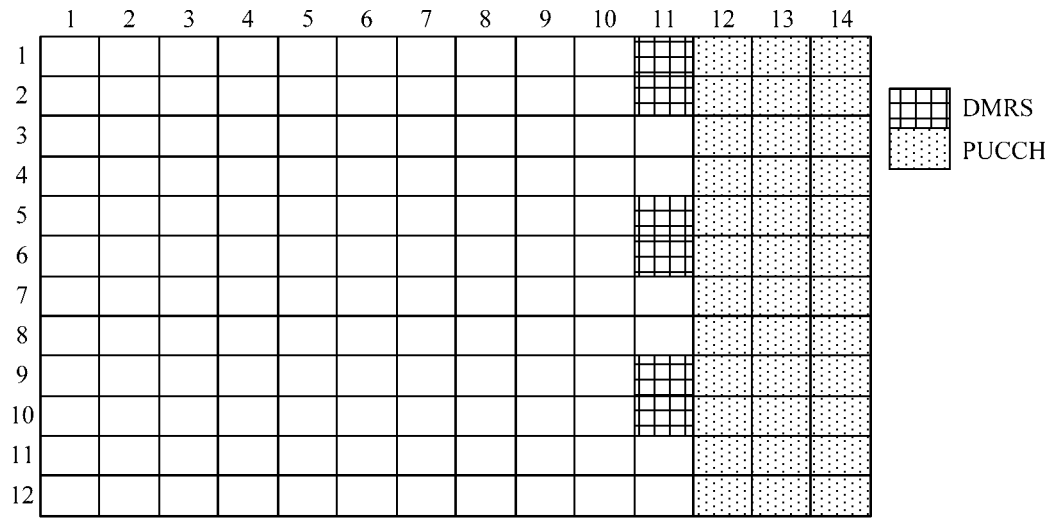
FIG. 3c is a schematic diagram of another DMRS pattern which is discrete on one symbol according to an embodiment of the present disclosure.

DMRS Pattern 2: the DMRS is only on a kth OFDM symbol. As shown in FIGS. 3a to 3c, the DMRS is a discrete symbol in the frequency domain.

In the DMRS pattern shown in FIG. 3a, the (k−1)th symbol is used for transmitting the PDCCH or the GP, and the CSI parameter is mapped on symbols whose symbol indexes greater than or equal to kin an order of k, k+1, k+2, k+3 one by one from the highest priority to the lowest priority.

In the DMRS pattern shown in FIG. 3b, none of the (k−1)th and the (k+1)th symbols is used for transmitting the PDCCH, the PUCCH and the GP, so the CSI parameter is mapped on symbols one by one, in an order of k, k−1, k+1, k−2, k−2, from the highest priority to the lowest priority.

In the DMRS pattern shown in FIG. 3c, the (k+1)th symbol is used for transmitting the PUCCH, and the CSI parameter is mapped on the symbols whose symbol indexes are less than or equal to k one by one, in an order of k, k−1, k−2, k−3, k−4, from the highest priority to the lowest priority. For the same symbol, the mapping is performed in the order of priority from the lowest carrier index to the highest carrier index. If the DMRS is on a symbol, the CSI parameter is not mapped on the carrier in which the DMRS is located.

Figure 2D:
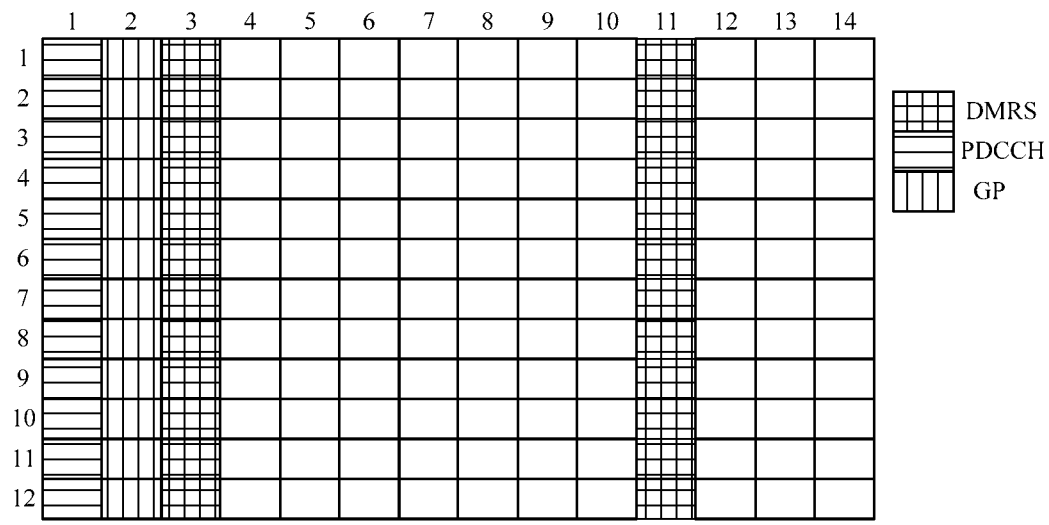
FIG. 2d is a schematic diagram of another DMRS pattern occupying a whole symbol according to an embodiment of the present disclosure.
Figure 2E:
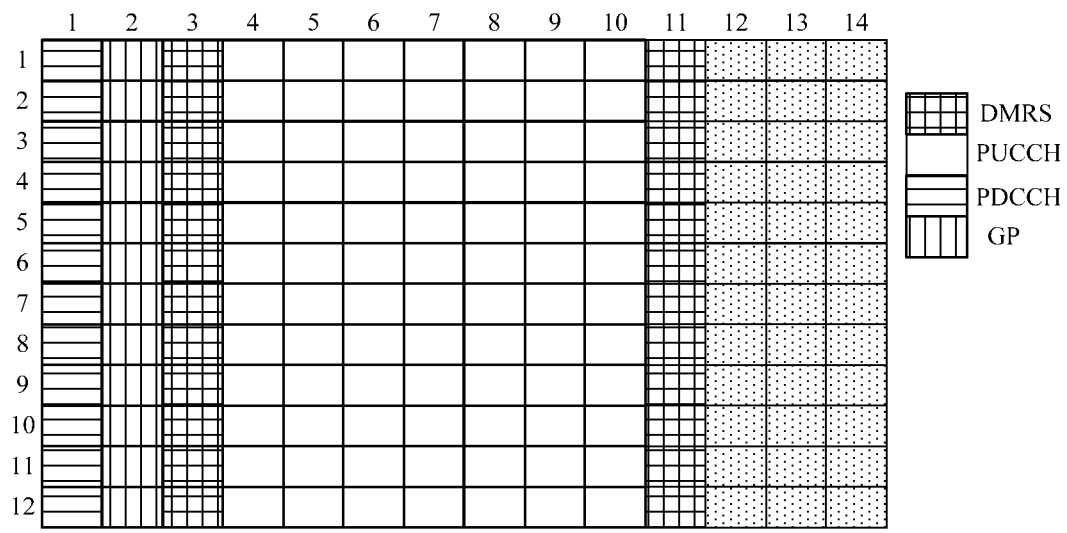
FIG. 2e is a schematic diagram of another DMRS pattern occupying a whole symbol according to an embodiment of the present disclosure.

DMRS Pattern 3: the DMRS is on the k1th and k2th OFDM symbols, as shown in FIGS. 2d and 2e, and the DMRS consecutively occupies the entire symbols in the frequency domain.

In the DMRS pattern shown in FIG. 2d, the (k1−1)th symbol is not used for transmitting the PDCCH or the GP, the CSI parameter is mapped, from the highest priority to the lowest priority, on symbols one by one in an order of k1+1, k2−1, k2+1, k1+2, k2−2, k2+2.

In the DMRS pattern shown in FIG. 2e, the (k2+1)th symbol is used for transmitting the PUCCH and the (k1−1)th symbol is used for transmitting the PDCCH or the GP, the CSI parameter is mapped, from the highest priority to the lowest priority, on symbols one by one in an order of k1+1, k2−1, k2+1, k1−2, k2−2, k2+2. If the (k−1)th symbol is not used for transmitting the PDCCH or the GP, and the (k2+1)th symbol is not used for transmitting the PUCCH, then the CSI parameter is mapped on symbols one by one in an order of k1−1, k1+1, k2−1, k2+1. On the same symbol, the mapping is performed in the order of priority, from the lowest carrier index to the highest carrier index.

Figure 3D:
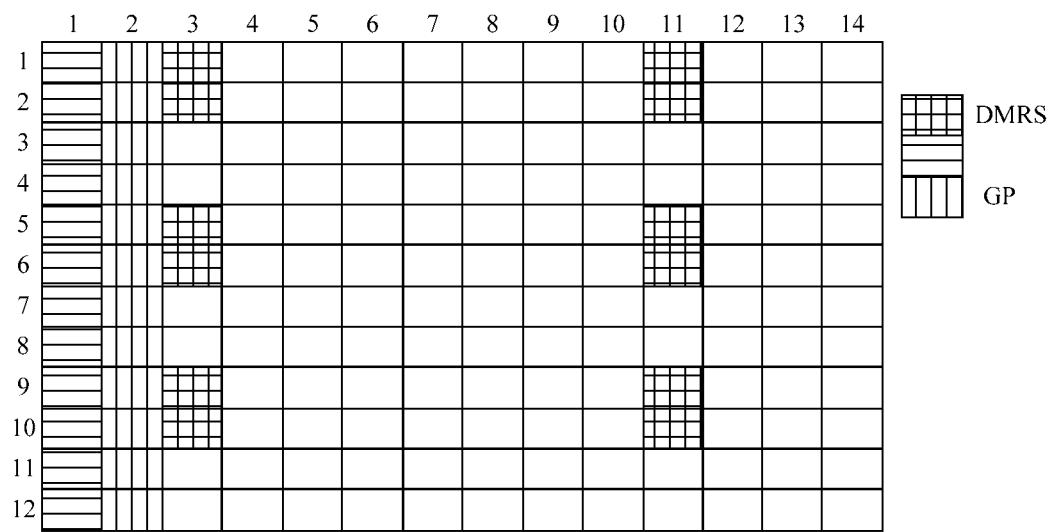
FIG. 3d is a schematic diagram of another DMRS pattern which is discrete on one symbol according to an embodiment of the present disclosure.
Figure 3E:
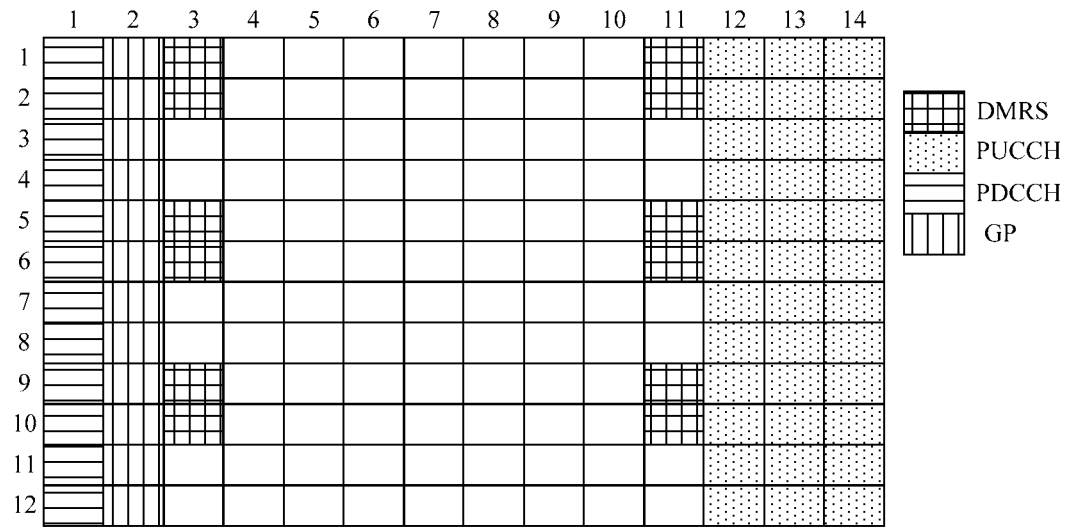
FIG. 3e is a schematic diagram of another DMRS pattern which is discrete on one symbol according to an embodiment of the present disclosure.

DMRS Pattern 4: the DMRS is on the k1th and the k2th OFDM symbols, as shown in FIGS. 3d and 3e, the DMRS is discrete in the frequency domain.

In the DMRS pattern shown in FIG. 3d, the (k1−1)th symbol is used for transmitting the PDCCH or the GP, and the CSI parameter is mapped, from the highest priority to the lowest priority, on symbols one by one in an order of k1, k2, k1+1, k2−1, k2+1, k1+2, k2−2, k2+2.

In the DMRS pattern shown in FIG. 3e, the (k2+1)th symbol is used for transmitting the PUCCH and the (k1−1)th symbol is used for transmitting the PDCCH or the GP, the CSI parameter is mapped, from the highest priority to the lowest priority, on symbols one by one in an order of k1, k2, k1+1, k2−1, k2+1, k1−2, k2−2, k2+2. If the (k−1)th symbol is not used for transmitting the PDCCH or the GP, and the (k2+1)th symbol is not used for transmitting the PUCCH, then the CSI parameter is mapped on symbols one by one in an order of k1, k2, k1−1, k1+1, k2−1, k2+1. For the same symbol, the mapping is performed in the order of priority, from the lowest carrier index to the highest carrier index.

Figure 2F:
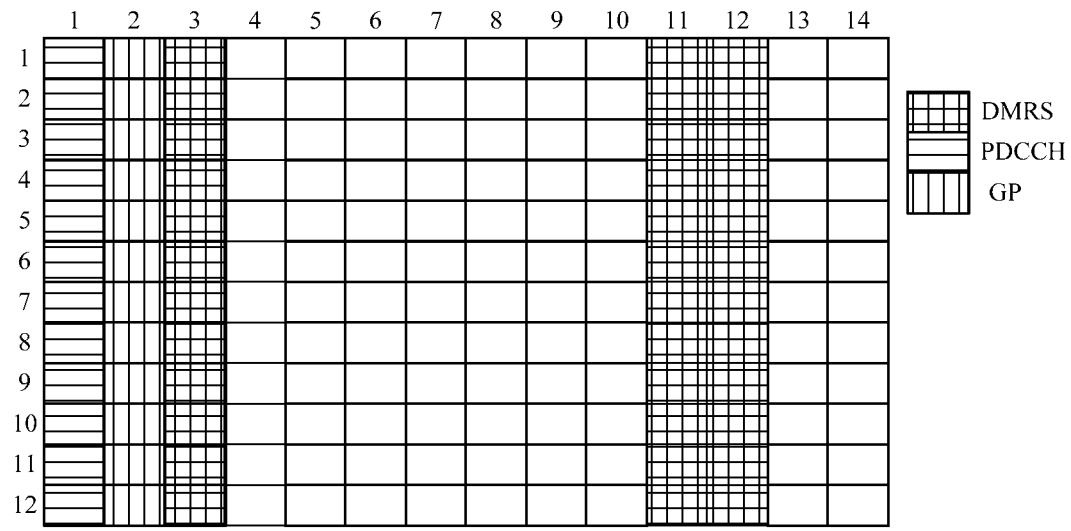
FIG. 2f is a schematic diagram of another DMRS pattern occupying a whole symbol according to an embodiment of the present disclosure.
Figure 2G:
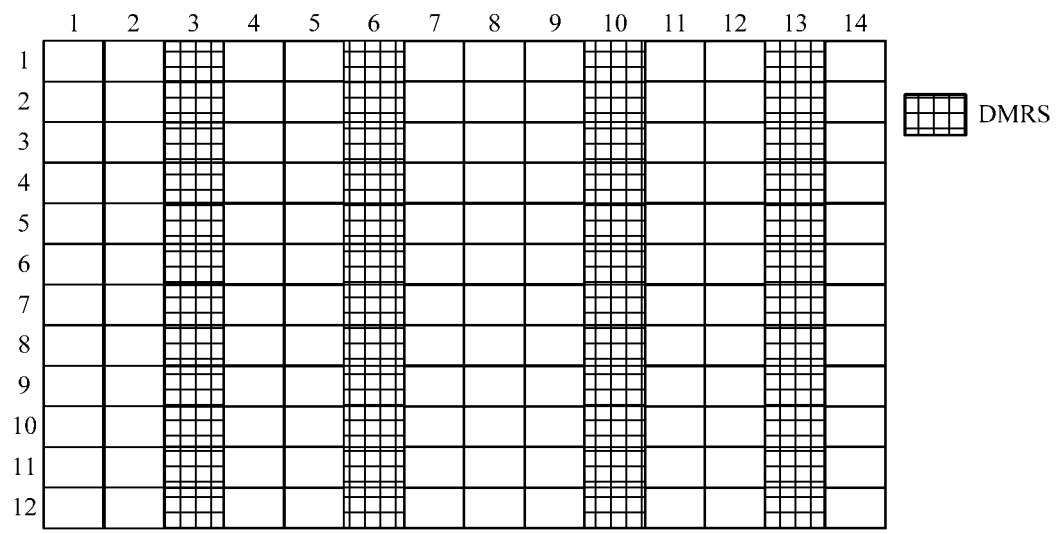
FIG. 2g is a schematic diagram of another DMRS pattern occupying a whole symbol according to an embodiment of the present disclosure.

DMRS Pattern 5: the DMRS is on the k1th, k2th, k3th and k4th OFDM symbols, as shown in FIGS. 2f and 2g, and the DMRS consecutively occupies the entire symbols in the frequency domain.

In the DMRS pattern shown in FIG. 2f, the k1th symbol and the k2th symbol are index-consecutive symbols, the k3th symbol and the k4th symbol are index-consecutive symbols, i.e., k2=k1+1 and k4=k3+1. The CSI parameter is mapped, from the highest priority to the lowest priority, on symbols one by one in an order of a symbol set of k1−1, k2+1, k3−1, k4+1, k1−2, k2+2, k3−2, k4+2. If the (k1−1) th symbols is used for transmitting the PDCCH or the GP, the symbol set does not include k1−1 and k1−2. If a (k4+1)th symbol is used for transmitting the PUCCH, the symbol set does not include k4+1 and k4+2.

In the DMRS pattern shown in FIG. 2g, the k1th, k2th, k3th and k4th symbols are discrete, the CSI parameter is mapped, from the highest priority to the lowest priority, on symbols one by one in an order of k−1, k1+1, k2−1, k2+1, k3−1, k3+1, k4−1, k4+1. If the (k1−1)th symbol is used for transmitting the PDCCH or the GP, the symbol set does not include k1−1, and if the (k4+1)th symbol is used for transmitting the PUCCH, the symbol set does not include k4+1. For the same symbol, the mapping is performed in the order of priority, from the lowest carrier index to the highest carrier index.

Figure 3F:
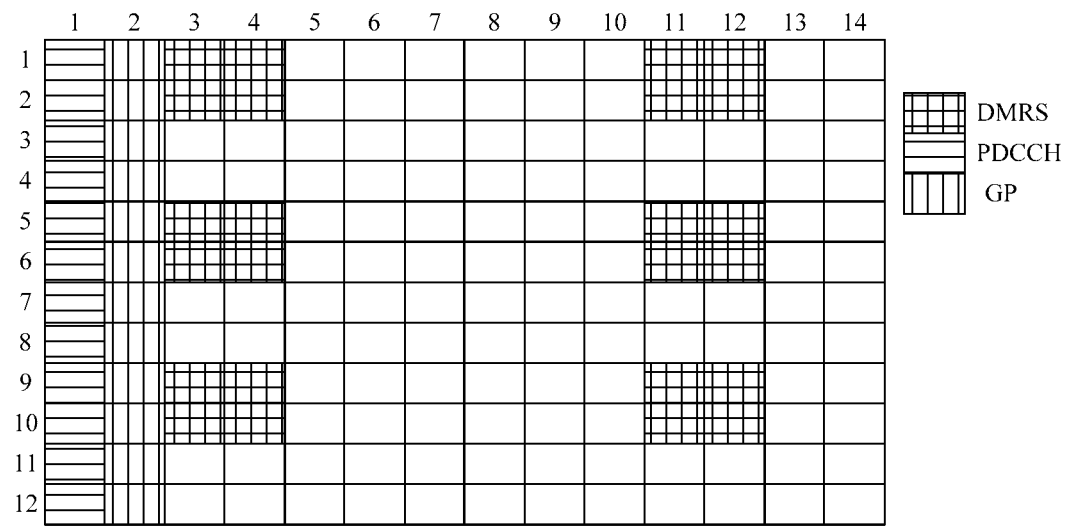
FIG. 3f is a schematic diagram of another DMRS pattern which is discrete on one symbol according to an embodiment of the present disclosure.
Figure 3G:
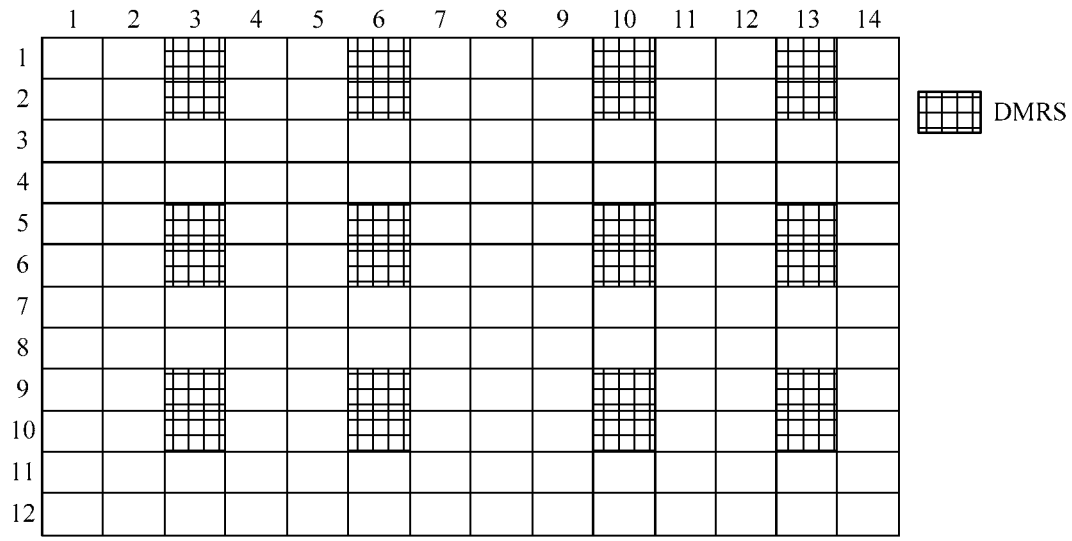
FIG. 3g is a schematic diagram of another DMRS pattern which is discrete on one symbol according to an embodiment of the present disclosure.

DMRS Pattern 6: the DMRS is on the k1th, k2th, k3th and k4th OFDM symbols, and as shown in FIGS. 3f and 3g, the DMRS is discrete in the frequency domain.

In the DMRS pattern shown in FIG. 3f, the k1th symbol and the k2th symbol are index-consecutive symbols, the k3th symbol and the k4th symbol are index-consecutive symbols, i.e., k2=k1+1 and k4=k3+1. The CSI parameter is mapped, from the highest priority to the lowest priority, on symbols one by one in an order of a symbol set of k1, k2, k3, k4, k1−1, k2+1, k3−1, k4+1, k1−2, k2+2, k3−2, k4+2. If the (k1−1) symbols is used for transmitting the PDCCH or the GP, the symbol set does not include k1−1 and k1−2. If the (k4+1)th symbol is used for transmitting the PUCCH, the symbol set does not include k4+1 and k4+2.

In the DMRS pattern shown in FIG. 3g, the k1th, k2th, k3th and k4th symbols are discrete, the CSI parameter is mapped, from the highest priority to the lowest priority, on symbols one by one in an order of k1, k2, k3, k4, k1−1, k1+1, k2−1, k2+1, k3−1, k3+1, k4−1, k4+1. If the (k1−1)th symbol is used for transmitting the PDCCH or the GP, the symbol set does not include k1−1, and if the (k4+1)th symbol is used for transmitting the PUCCH, the symbol set does not include k4+1. For the same symbol, the mapping is performed in the order of priority, from the lowest carrier index to the highest carrier index.

It is to be noted that the CSI parameter mapping herein means modulating a modulation symbol corresponding to the CSI parameter to a resource element (RE) for transmitting the CSI parameter. It may also be described as determining a time-frequency resource position of the CSI parameter, and transmitting the CSI parameter on the time-frequency resource position.

In addition, the mapping process of the CSI parameter may also be applied to the mapping process of the second uplink control channel parameter. Here, the second uplink control channel parameter is the uplink control channel parameter other than the CSI parameter, which includes, but is not limited to, one of: an acknowledgement (ACK), a negative acknowledgement (NACK), a scheduling request (SR), or a buffer status report (BSR).

The mapping process may be performed by replacing the CSI parameter in this embodiment with the second uplink control channel parameter. The priority of the second uplink control channel parameter is generally higher than the priority of the CSI parameter.

It is to be noted that the mapping process of the CSI parameter may also be applied to the mapping process in which both the second uplink control channel parameter and the CSI parameter are involved. Here, the second uplink control channel parameter is the uplink control channel parameter other than the CSI.

The mapping process may be performed by replacing the CSI parameter in this embodiment with the second uplink control channel parameter and the CSI parameter. The priority of the second uplink control channel parameter is generally higher than the priority of the CSI parameter. That is, the second uplink control parameter is mapped first, and then the CSI parameter is mapped.

The above embodiment of the present disclosure provides the implementation method of determining the time-frequency resource position for feeding back the CSI parameter according to the priority of the CSI parameter to be fed back. Since the pilot design of the DMRS is relatively complicated, multiple patterns may be designed according to characteristics such as time selective fading (of channel), frequency domain selective fading (of channel) and frame structure, so that a positional relationship design for feeding back the CSI parameter also becomes complicated. Therefore, the embodiment of the present disclosure further provides a method for determining the time-frequency resource position of the CSI parameter to be fed back for different DMRS patterns, and the CSI parameter can be fed back with a reasonable overhead by using the method provide by the embodiment of the present disclosure for determining the time-frequency resource position for feeding back the CSI parameter.

Embodiment Three

Based on the above embodiments, the embodiment of the present disclosure further provides another implementation method of the step of determining the time-frequency resource position of the CSI parameter to be fed back according to the priority of the CSI parameter to be fed back in the method for feeding back the channel state information. A time-frequency resource position relationship between the CSI parameter and a DMRS pattern is implicitly determined according to higher layer or physical layer signaling in the embodiment of the present disclosure.

The time-frequency resource position for feeding back the CSI parameter is determined according to first signaling sent by a first communication node and the priority of the CSI parameter to be fed back, where the first signaling includes physical layer signaling and/or higher layer signaling. The first signaling at least carries one of:

a demodulation reference signal (DMRS) pattern, a number of Layers, a multiple-input multiple-output (MIMO) mode, a time unit structure, a subcarrier type, a system bandwidth size, a carrier frequency modulation mode, a number of symbols occupied by a DMRS, a start position of a data shared channel, a sending time length of the data shared channel, or an orthogonal cover code (OCC) of the DMRS.

The DMRS pattern, the pattern of the DMRS, mainly refers to a pattern of resource elements, occupied by the DMRS, in a physical resource block (PRB). As shown in FIGS. 2a~2g or FIGS. 3a~3g, the PRB is a resource unit including multiple symbols and multiple subcarriers, for example, one PRB in the NR or the LTE includes 14 symbols and 12 carriers.

The number of Layers denotes the number of data layers simultaneously transmitted in a multi-antenna technology.

The MIMO mode denotes multiple MIMO transmission modes defined in the multi-antenna technology transmission. For example, in the LTE, a transmission mode 2 is spatial frequency diversity; a transmission mode 3 is open-loop spatial multiplexing or is referred to as an open-loop MIMO technology; a transmission mode 4 is close-loop spatial multiplexing; a transmission mode 5 is a multi-user MIMO; a transmission mode 6 is single-Layer close-loop spatial multiplexing; a transmission mode 7 is a single-stream beamforming; a transmission mode 8 is dual-stream beamforming; a transmission mode 9 supports up to 8-layer spatial multiplexing, implements adaptive switching between multiple users and signal user and adaptive switching of the number of data layers, and supports open-loop MIMO and close-loop MIMO modes; and a transmission mode 10 supports a joint transmission of multiple transmission nodes.

The time unit structure is as follows. In a TDD system, symbols of one subframe include: f1 downlink symbols, f2 GP symbols, and f3 uplink symbols. f=f1+f2+f3 is the number of symbols of one subframe and f generally is 14 under a normal cyclic prefix. Different f1, f2 and f3 correspond to different time unit structures.

The carrier type mainly refers to a carrier type used in an uplink, and includes SC-FDMA and OFDMA.

The system bandwidth size refers to a total number of physical resource blocks included in the wireless communication system.

For the number of symbols occupied by the DMRS, in the NR, the DMRS occupies 1~4 symbols.

A length of a sending time of the data shared channel denotes a symbol length from a start position for sending the data shared channel to an end position for sending the data shared channel. For different time unit structures, the value of the symbol length may be different.

The second communication node receives the first signaling, and determines, according to information carried by the first signaling, the time-frequency resource position of the DMRS transmitted by the first communication node. After determining the time-frequency resource position of the transmitted DMRS, according to the priority of the CSI parameter and the method provided in other embodiments of the present disclosure, the time-frequency resource position for transmitting the CSI parameter is determined, and the CSI parameter is mapped on the time-frequency resource position for transmitting the CSI parameter and then is transmitted.

The first communication node determines by itself the time-frequency resource position where the second communications node transmits the CSI parameter, determines the CSI parameter content represented by the time-frequency resource position according to the priority of the CSI parameter, and receives the CSI parameter on the CSI time-frequency resource position.

It is to be noted that the above mapping process of the CSI parameter may be applied to a mapping process of a second uplink control channel parameter. Here, the second uplink control channel parameter is the uplink control channel parameter other than the CSI, and includes, but is not limited to, one of: an acknowledgement (ACK), a negative acknowledgement (NACK), a scheduling request (SR), or a buffer status report (BSR).

The mapping process may be performed by replacing the CSI parameter with the second uplink control channel parameter in the embodiment. The priority of the second uplink control channel parameter is generally higher than the priority of the CSI parameter.

It is to be noted that a mapping process of the CSI parameter may also be applied to a mapping process including both the second uplink control channel parameter and the CSI parameter. Here, the second uplink control channel parameter is the uplink control channel parameter other than the CSI.

To more clearly describe how the content included in the first signaling affects the CSI parameter mapping, the following description will be made with reference to different examples.

Example 1

The First Signaling is Used for Indicating Different DMRS Patterns

Here, the first signaling is used for indicating the DMRS pattern, and different values of S may correspond to different DMRS patterns. For example, when S=1, the DMRS pattern is as shown in FIG. 2a, and then the second communication node or the first communication node maps, according to the priority of the CSI parameter, the CSI parameter on symbols one by one in an order of k+1, k+2, k+3, k+4, where k is an index of the symbol in which the DMRS is located. When S=2, the DMRS pattern is as shown in FIG. 2c, and the second communication node or the first communication node maps, according to the priority of the CSI parameter, the CSI parameter on the symbols one by one in an order of k−1, k−2, k−3, k−4, where K is the index of the symbol in which the DMRS is located.

Example 2

The First Signaling is Used for Indicating the Number of Layers, i.e. the Number of Layers in the Data Transmission Here, the first signaling is used for indicating the number of Layers, and different values of S may correspond to different numbers of Layers. For example, the first signaling in which S=1 indicates Layer=1, the DMRS pattern is as shown in FIG. 2a, and the second communication node or the first communication node maps, according to the priority of the CSI parameter, the CSI parameter on symbols one by one in an order of k+1, k+2, k+3, k+4, where k is an index of the symbol on which the DMRS is located. The first signaling in which S=2 indicates Layer=2, the DMRS pattern is as shown in FIG. 2d, and the second communication node or the first communication node maps, according to the priority of the CSI parameter, the CSI parameter on symbols one by one in an order of k1+1, k2−1, k2+1, k1+2, k2−2, k2+2, where k1 is an index of the symbol on which a first group of the DMRS is located, and k2 is an index of the symbol on which a second group of the DMRS is located.

Example 3

The First Signaling is Used for Indicating the MIMO Transmission Mode

Here, the first signaling is used for indicating the transmission mode, and different values of S may correspond to different transmission modes. For example, S=7 indicates a transmission mode 7, the DMRS pattern is as shown in FIG. 2a, and the second communication node or the first communication node maps the CSI parameter, according to the priority of the CSI parameter, on symbols one by one in an order of k+1, k+2, k+3, k+4, where k is an index of the symbol on which the DMRS is located. S=8 indicates a transmission mode 8, the DMRS pattern is as shown in FIG. 2d, and the second communication node or the first communication node maps, according to the priority of the CSI parameter, the CSI parameter on symbols one by one in an order of k1+1, k2−1, k2+1, k1+2, k2−2, k2+2, where k1 is an index of the symbol on which the first group of the DMRS is located, and k2 is an index of the symbol on which the second group of the DMRS is located.

Example 4

The First Signaling is Used for Indicating the Time Unit Structure

Here, the first signaling is used for indicating the time unit structure, and different values of S may correspond to different time unit structures. For example, S=1 indicates a time unit structure 1, the DMRS pattern is as shown in FIG. 2a, the second communication node or the first communication node maps, according to the priority of the CSI parameter, the CSI parameter on symbols one by one in an order of k+1, k+2, k+3, k+4, where k is an index of the symbol on which the DMRS is located. S=2 indicates a time unit structure 2, the DMRS pattern is as shown in FIG. 2c, the second communication node or the first communication node maps, according to the priority of the CSI parameter, the CSI parameter on symbols one by one in an order of k−1, k−2, k−3, k−4, where k is the index of the symbol on which the DMRS is located.

Example 5

The First Signaling is Used for Indicating the Carrier Type

Here, the first signaling is used for indicating the carrier type, and different values of S may correspond to different carrier types. For example, S=1 indicates SC-FDMA, the DMRS pattern is shown in FIG. 2a, the second communication node or the first communication node maps, according to the priority of the CSI parameter, the CSI parameter on symbols one by one in an order of k+1, k+2, k+3, k+4, where k is an index of the symbol on which the DMRS is located. S=2 indicates OFDMA, the DMRS pattern is shown in FIG. 3a, and the second communication node or the first communication node maps, according to the priority of the CSI parameter, the CSI parameter on the symbols one by one in an order of k, k−1, k−2, k−3, k−4, where k is the index of the symbol on which the DMRS is located.

Example 6

The First Signaling is Used for Indicating the System Bandwidth Size

The system bandwidth size mainly affects the number of symbols used for transmitting the CSI parameter. When the system bandwidth is relatively small, the number of PRBs for transmitting physical uplink shared data is relatively small, so the number of PRBs for transmitting the CSI parameter is relatively small, i.e., the number of carriers in a frequency domain is relatively small. If the number of CSI parameters is unchanged, the number of symbols used by a system with a small system bandwidth in the transmission of the CSI parameter is larger than the number of symbols used by a system with a large system bandwidth in the transmission of the CSI parameter. For example, for FIG. 2a, a system of 2.5M transmits the CSI parameter by using c k+1, k+2, k+3, k+4, and a system of 10M transmits the CSI parameter only using symbols k+1 and k+2. k is the index of the symbol on which the DMRS is located.

Example 7

The First Signaling is Used for Indicating a Carrier Hopping Mode

Figure 3H:
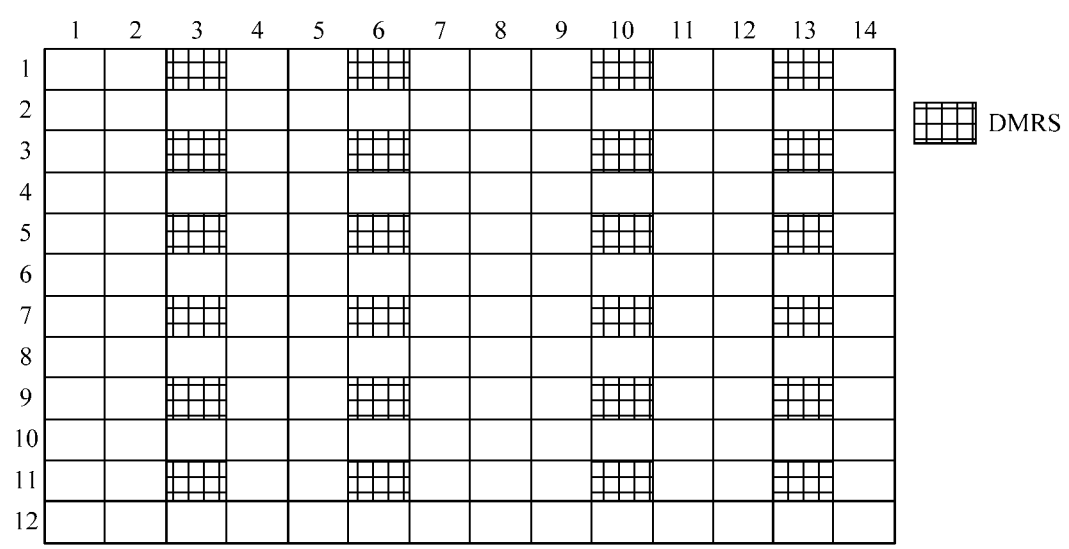
FIG. 3h is a schematic diagram of another DMRS pattern which is discrete on one symbol according to an embodiment of the present disclosure.

The carrier hopping modes cause different DMRS patterns, and also causes the number of REs for transmitting the PDSCH or the CSI parameter on the symbol on which the DMRS is located to be different. For example, S=1 indicates a carrier hopping mode 1, as shown in FIG. 3d. For another example, S=2 indicates a carrier hopping mode 2, as shown in FIG. 3h. As shown in FIG. 3h, the second communication node or the first communication node maps, according to the priority of the CSI parameter, the CSI parameter on the symbols one by one in an order of k1+1, k2−1, k2+1, k1+2, k2−2, k2+2. Different frequency modulation modes correspond to differently mappings. Specifically, in different frequency modulation modes, the CSI parameter is mapped on different subcarriers in the frequency domain, or the number of subcarriers on which the CSI parameter is mapped is different. k1 is the index of the symbol on which the first group of the DMRS is located, and k2 is the index of the symbol on which the second group of the DMRS is located.

Example 8

The First Signaling is Used for Indicating the Number of Symbols Occupied by the DMRS Here, the first signaling is used for indicating the number of symbols occupied by the DMRS, and the value of S may correspond to the number of symbols. For example, S=1 indicates that the DMRS is on only one symbol, the DMRS pattern is shown in FIG. 2a, and the second communication node or the first communication node maps, according to the priority of the CSI parameter, the CSI parameter on symbols one by one in an order of k+1, k+2, k+3, k+4, where k is the index of the symbol on which the DMRS is located. S=2 indicates that the DMRS is on only two symbols, the DMRS pattern is shown in FIG. 2d, and the second communication node or the first communication node maps, according to the priority of the CSI parameter, the CSI parameter on symbols one by one in an order of k1+1, k2−1, k2+1, k1+2, k2−2, k2+2, where k1 is the index of the symbol on which the first group of the DMRS is located, and k2 is the index of the symbol on which the second group of the DMRS is located.

Example 9

The First Signaling is Used for Indicating the Start Position of the Data Shared Channel Here, the first signaling is used for indicating the start position of the data shared channel, and different values of S indicate different start positions of the data shared channel. For example, S=3 indicates that a start position of the data shared channel is 3, the DMRS pattern is shown in FIG. 2a, and the second communication node or the first communication node maps, according to the priority of the CSI parameter, the CSI parameter on symbols in an order of k+1, k+2, k+3, k+4 one symbol by one symbol, where k is a minimum value among the indexes of the symbols on which the DMRS is located and 3. S=4 indicates that the start position of the data shared channel is 4, k is a minimum value among the indexes of the symbols on which the DMRS is located and 4.

Example 10

The First Signaling is Used for Indicating the OCC of the DMRS

Here, the first signaling is used for indicating different OCCs, and different values of S may correspond to the number of symbols. S=2 indicates that the OCC is 2, the DMRS pattern is as shown in FIG. 2d, and the second communication node or the first communication node maps, according to the priority of the CSI parameter, the CSI parameter on symbols, one symbol by one symbol, in an order of k1+1, k2−1, k2+1, k1+2, k2−2, k2+2, where k1 is the index of the symbol on which a first group of the DMRS is located, and k2 is the index of the symbol on which a second group of the DMRS is located.

For example, S=4 indicates that the OCC is 4, the DMRS pattern is as shown in FIG. 2g, and the second communication node or the first communication node maps, according to the priority of the CSI parameter, the CSI parameter on symbols, one symbol by one symbol, in an order of k1+1, k2−1, k2+1, k3−1, k3+1, k4−1, k4+1, where k1, k2, k3 and k4 are the indexes of the symbols on which the DMRS is located.

It is to be noted that the parameters corresponding to multiple types of first signaling in examples 1~10 may be combined together to determine the CSI parameter mapping. For example, the resource mapping of the CSI parameter is determined based on the OCC and the number of Layers. For another example, the resource mapping of the CSI parameter is determined by the system bandwidth size, the number of symbols on which the DMRS is located, the number of Layers. The resource mapping of CSI parameter may be determined by other types of combinations of the above parameters, which are not described herein.

It is to be noted that the mapping method of the CSI parameter is also applicable to the second uplink control channel parameter such as ACK/NACK, or is applicable to the resource mapping when both the CSI parameter and the second uplink control channel parameter are transmitted.

Embodiment Four

This embodiment provides an implementation method of the step of feeding back the CSI parameter on the time-frequency resource position in the method for feeding back channel state information when the CSI parameter to be fed back includes a RSRP which includes a first-level RSRP and a second-level RSRP. The method includes the steps described below.

In step 41, the first-level RSRP is fed back through physical layer signaling.

In step 42, the second-level RSRP is transmitted through an MAC CE.

In other embodiments, the first-level RSRP and the second-level RSRP may be transmitted through the physical layer signaling.

How to transmit and receive the RSRP in a multi-level manner is described below.

Since RSRP indicates a power for receiving a reference signal, the first communication node sends a reference pilot with different radio frequency (RF) beams, and/or the second communication node receives the reference pilot with different RF beams, the power of the obtained reference signal is different. That is, a RSRP is provided between an RF transmit beam and an RF receive beam (which are referred to as a beam pair link, BPL). In a high-frequency system, a path loss is large and a penetration loss is also large, one blocking may cause links corresponding to the selected transmit beam or receive beam directions to be no longer applicable, so that it is necessary to feed back multiple RSRPs corresponding to the BPL. For example, ten RSRPs are fed back, each RSRP is quantized by using multiple bits, such as 8 bits, so the quantization of these RSRPs needs 80 bits. If a larger number of RSRPs are fed back, more resources are needed to directly transmit these RSRPs. So the RSRP is transmitted or obtained in a multi-level manner.

In the multi-level feedback or transmission, the first communication node and the second communication node determine a first-level RSRP and a second-level RSRP though an agreement, and the second transmission node transmits the first-level RSRP at a first moment, and transmits the second-level RSRP at a second moment, thereby achieving the purpose of saving transmission overhead.

The first communication node receives the first-level RSRP at the first moment, receives the second-level RSRP at the second moment, and obtains the RSRP of each link through calculation according to the first-level RSRP and the second-level RSRP.

Here, the first-level RSRP includes a smaller number of quantization bits, and thus may be transmitted through the physical layer signaling, and the second-level RSRP includes a larger number of quantization bits, and thus may be transmitted in the higher layer signaling such as media access control (MAC) layer signaling, where the MAC layer signaling may be referred to as the MAC CE (MAC Control Element). Of course, it is not excluded that both the first-level RSRP and the second-level RSRP are transmitted in the physical layer or in the MAC layer. That is, the first-level RSRP and the second-level RSRP both are transmitted in the physical layer, or the first-level RSRP and the second-level RSRP both are transmitted in the MAC layer.

Here, the second-level RSRP is determined by the first-level RSRP. That is, the implementation process of determining the second-level RSRP according to the first-level RSRP may be in the following manners.

A first manner: the second-level RSRP is quantized based on the first-level RSRP. That is, the second-level RSRP is determined according to the first-level RSRP and the offset of the first-level RSRP, or the second-level RSRP is determined according to the first-level RSRP and the differential of the first-level RSRP.

For example, RSRP1~RSRP10 are divided into two groups, each group has five RSRPs, i.e., a first group is {RSRP1~RSRP5} and a second group is {RSRP6~RSRP10}. Such grouping may correspond to the BPL grouping. Alternatively, RSRPs corresponding to pilots sent by adjacent several beams are grouped into one group. Here the number of groups and the number of RSRPs included in each group may also be other values.

The first-level RSRP includes two values, a first value $RSRP_{1,1}$ is an average value of a first group of RSRPs, and a second value $RSRP_{1,2}$ is an average value of a second group of RSRPs. Of course, the average value here may be replaced by a maximum value, a first element, a maximum element, a minimum element, or a last element of a group of RSRPs. The second communication node feeds back the $RSRP_{1,1}$ and the $RSRP_{1,2}$ at the first moment, and accordingly, the first communication node receives the $RSRP_{1,1}$ and the $RSRP_{1,2}$.

The second communication node feeds back the second-level RSRP $\{RSRP_{2,1}\sim RSRP_{2,5}\}$ corresponding to the first group of RSRPs, and the second-level RSRP $\{RSRP_{2,6}\sim RSRP_{2,10}\}$ corresponding to the second group of RSRPs at the second moment.

In $RSRP_{i,j}$, i=1, 2 and indicates the ith-level RSRP, j indicates the jth one of the ith-level RSRP and a value of j is 1, 2 when i=1 and the value of j is 1~10 when i=2.

$RSRP_{2,j}$ represents an offset or a differential of the first-level $RSRP_{i,k}$, i.e., the second-level RSRP represents the offset or the differential of the first-level RSRP. For example, $RSRP_{2,1}$ is an offset value and equals to 1, and then $RSRP1=RSRP_{1,1}+d*RSRP_{2,1}$, d is a differential or an offset value. Of course, the second-level RSRP may also be a further quantization of the first-level RSRP, such as jointing a group of RSRPs in a certain step length around $RSRP_{1,1}$ to form a second group of RSRPs.

The first communication node receives the second-level RSRP, and obtains an actual RSRP of a corresponding BPL according to the first-level RSRP, such as $RSRP1=RSRP_{1,1}+d*RSRP_{2,1}$.

A second mode, when the first-level RSRP is a RSRP corresponding to a beam with a beam group index of 1, it is determined that the RSRP other than the first-level RSRP is the second-level RSRP.

In other embodiments, the second-level RSRP represents the difference or the offset of the first-level RSRP.

Embodiment Five

The embodiment of the present disclosure provides a method for joint encoding the CSI parameter. Before feeding back the CSI parameter on the time-frequency resource position, the second communication node may perform joint encoding on two or more CSI parameters or on one CSI parameter set, where the CSI parameter set includes at least two CSI parameters. The jointly encoded CSI parameters may be taken as a same variable for transmission. For example, RI and i2 are jointly encoded, RI occupies 3 bits, and i2 occupies 4 bits, so that RI and i2 are jointly encoded into a 7-bit variable. Such variable may become a 22-bit variable for transmission through channel encoding.

A CSI parameter set which can be jointly encoded by the second communication node includes, but is not limited to, any one of the following parameter sets or parameter combinations.

Multiple first-level RSRPs are jointly coded. For example, if two RSRP11 and RSRP12 are provided, the two RSRPs are jointly encoded to form a new variable for transmission.

One or more first-level RSRPs and the CRI1 are jointly coded.

The CRI1 and the CRI2 are jointly coded.

The CRI2 and the RI are jointly coded.

Any two or more of the CRI1, a beam group index, a port index, or a beam index are jointly coded.

Any two or more of the RI, amplitude information of a linear combination codebook, phase information of the linear combination codebook, or beam information of the linear combination codebook are jointly coded. When receiving the jointly coded CSI parameter set, the first communication node may perform demodulation on the jointly coded CSI parameter set, and thus obtains the CSI parameter corresponding to the jointly coded CSI parameter set.

Embodiment Six

Figure 4:
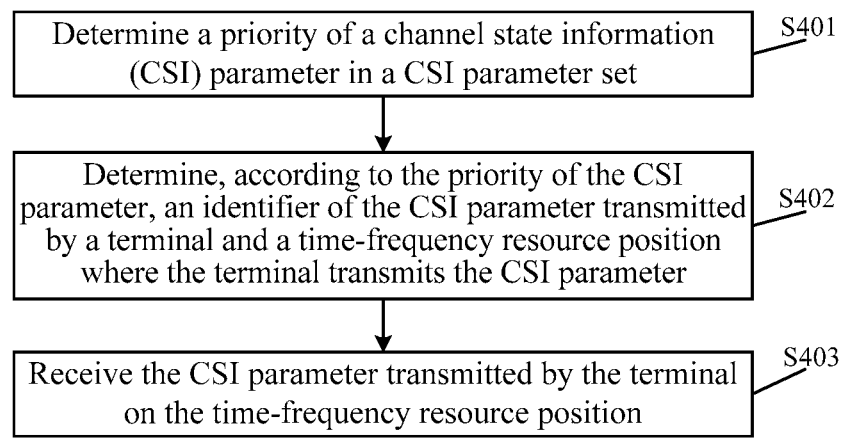
FIG. 4 is an implementation flowchart of a method for receiving channel state information according to an embodiment of the present disclosure.

An embodiment of the present disclosure provides a method for receiving channel state information. FIG. 4 is an implementation flowchart of the method for receiving channel state information according to an embodiment of the present disclosure. As shown in FIG. 4, the method includes steps described below.

In step S401, a first communication node determines a priority of a channel state information (CSI) parameter in a CSI parameter set.

Here, before the step S401 of determining the priority of the CSI parameter in the CSI parameter set, the method further includes: acquiring the CSI parameters included in the CSI parameter set according to higher layer signaling configured by itself; or determining the CSI parameter transmitted by a second communication node according to a time-frequency resource position where the second communication node transmits the CSI parameter.

In step S402, the first communication node determines, according to the priority of the CSI parameter, the CSI parameter transmitted by the second communication node and the time-frequency resource position where the second communication node transmits the CSI parameter.

In step S403, the first communication node receives, on the time-frequency resource position, the CSI parameter transmitted by the second communication node.

The CSI parameter includes at least one of: a first-type CSI parameter or a second-type CSI parameter.

The first-type CSI parameter includes at least one of: a reference signal received power (RSRP), a first-type channel state information reference signal resource indicator CRI1, a beam group index, a beam index, a port group index, a first-level RSRP, or a second-level RSRP.

The second-type CSI parameter includes at least one of: a channel rank indicator (RI), a second-type channel state information reference signal resource indicator CRI2, a precoding matrix index, a wideband channel quality indicator (WB CQI), a sub-band channel quality indicator (SB CQI), a first precoding matrix index, a second precoding matrix index, beam information of a linear combination codebook, phase information of the linear combination codebook, or amplitude information of the linear combination codebook.

In other embodiments of the present disclosure, the step S401 in which the first communication node determines the priority of the CSI parameter in the CSI parameter set may be implemented in the modes described below.

The first communication node determines, by itself, according to a preset rule, a priority of a CSI parameter to be fed back by the second communication node according to request.

The first communication node determines the priority of the CSI parameter according to received higher layer signal and/or physical layer signaling, where the received higher layer signal and/or physical layer signaling is transmitted by the second communication node and carries a priority relationship.

The first communication node determines the priority of the CSI parameter according to the preset rule agreed by the second communication node and the first communication node in advance.

It is noted that the rule followed when the first communication node determines the priority of the CSI parameter by itself or when the first communication node determines the priority of the CSI parameter according to the agreement with the second communication node is the same as the priority relationships specified in A.1), A.2) and A.3) in other embodiments of the present disclosure.

The priority of the CSI parameter includes at least one of: a priority relationship configured based on a degree of delay sensitivity of the CSI parameter, a priority relationship configured based on importance of the CSI parameter, and a priority relationship configured based on a scheduling order of the CSI parameter.

In other embodiments of the present disclosure, determining the CSI parameter transmitted by the second communication node according to the priority of the CSI parameter includes:

determining the CSI parameter transmitted by the second communication node according to the priority of the CSI parameter includes:

dividing the parameters in the CSI parameter set into C1 CSI parameter subsets;

determining, from the C1 CSI parameter subsets, C2 CSI parameter subsets having highest priorities as a set of CSI parameters transmitted by the second communication node, where a priority of the CSI parameter subset is determined by a priority of a CSI parameter having the highest CSI priority in the CSI parameter subset; where C1 and C2 are positive integers, and C2 is less than and equal to C1.

The CSI parameters transmitted by the second communication node are part or all of CSI parameters in the CSI parameter set.

In other embodiments of the present disclosure, determining a time-frequency resource position of the CSI parameter transmitted by the second communication node according to the priority of the CSI parameter includes:

determining the time-frequency resource position of the CSI parameter according to the priority of the CSI parameter transmitted by the second communication node and first signaling configured by the first communication node itself, where the first signaling includes physical layer signaling and/or higher layer signaling. The first signaling at least carries one of:

a demodulation reference signal (DMRS) pattern, a number of Layers, a multiple-input multiple-output (MIMO) mode, a time unit structure, a subcarrier type, a system bandwidth size, a carrier frequency modulation mode, a number of symbols occupied by a DMRS, a start position of a data shared channel, a sending time length of the data shared channel, or an orthogonal cover code (OCC) of the DMRS.

In other embodiments of the present disclosure, the time-frequency resource position is a time-frequency resource position of the CSI parameter relative to a DMRS, and the step of determining the time-frequency resource position of the CSI parameter according to the priority of the CSI parameter transmitted by the second communication node includes:

for a same carrier, if N1<N2, a priority of a CSI parameter on a ith symbol is not lower than a priority of a CSI parameter on a jth symbol; if N1>N2, the priority of the CSI parameter on the ith symbol is not higher than the priority of the CSI parameter on the jth symbol; if N1=N2 and i<j, the priority of the CSI parameter on the ith symbol is not lower than the priority of the CSI parameter on the jth symbol; if N1=N2 and i>j, the priority of the CSI parameter on the ith symbol is not higher than the priority of the CSI parameter on the jth symbol.

N1 is a minimum value of a first index difference set, the first index difference set is composed of absolute values of differences between the symbol index of the ith symbol and symbol indexes of Nd symbols on which the DMRS is located; N2 is a minimum value of a second index difference set, the second index difference set is composed of absolute values of differences between the symbol index of the jth symbol and the symbol indexes of the Nd symbols on which the DMRS is located, i and j are non-negative integers less than Ns, Nd is a positive integer less than Ns, and Ns is the number of symbols in one subframe. Another method or description method for obtaining N1 and N2 is N1=min(|k−i|) and N2=min (|k−j|). i, k, j are non-negative integers smaller than Ns, k is symbol indexes of the one or more symbols on which the DMRS is located, |c| denotes an absolute value of c, and min(C) denotes a minimum value of a C set.

and/or for different carriers on a same symbol, a priority of a CSI parameter transmitted on an m1th carrier is not lower than that of a CSI parameter transmitted on an m2th carrier, wherein m1<m2, and m1 and m2 are positive integers.

In other embodiments of the present disclosure, the time-frequency resource position is a time-frequency resource position of the CSI parameter relative to a DMRS, and the step of determining the time-frequency resource position of the CSI parameter transmitted by the second communication node includes:

for any symbol k on which the DMRS is located, in response to determining that the DMRS is discrete on a frequency domain on the symbol k, mapping the CSI parameter, according to the priority order of the CSI parameter, on symbols in an order of k, k−1, k+1, . . . , k−N1, k+N1, and in response to determining that a symbol with a symbol index of k−N1 is used for transmitting a downlink control channel or a guard period (GP), then symbols whose symbol indexes are less than k−N1 are not used for transmitting the CSI parameter; in response to determining that a symbol with a symbol index of k+N1 is used for transmitting an uplink control channel, then symbols whose symbol indexes are greater than k+N1 are not used for transmitting the CSI parameter, where N1 is a positive integer and less than Ns/2, and Ns is a number of symbols included in one subframe; or for any symbol k on which the DMRS is located, in response to determining that the DMRS occupies all sub-carriers on the symbol K in the frequency domain, mapping the CSI parameter, according to a priority order of the CSI parameter, on symbols in an order of k−1, k+1, . . . , k−N1, k+N1, and in response to determining that a symbol with a symbol index of k−N1 is used for transmitting the downlink control channel or the guard period (GP), then symbols whose symbol indexes are less than k−N1 are not used for transmitting the CSI parameter; in response to determining that the symbol with the symbol index of k+N1 is used for transmitting the uplink control channel, then symbols whose symbol indexes are greater than k+N1 are not used for transmitting the CSI parameter, and the symbol used for transmitting the DMRS is not used for transmitting the CSI parameter; where N1 is a positive integer and less than Ns/2, and Ns is the number of symbols included in one subframe.

In other embodiments of the present disclosure, the step of determining the time-frequency resource position of the CSI parameter transmitted by the second communication node according to the priority of the CSI parameter further includes the following steps.

A symbol ordered set for transmitting the CSI parameter is determined according to a DMRS pattern.

A mapping relationship between the CSI parameter and symbols in the symbol ordered set for transmitting the CSI parameter is determined according to the priority of the CSI parameter. A sequence number of a symbol in the symbol ordered set corresponding to a CSI parameter having a higher priority is smaller than a sequence number of a symbol in the symbol ordered set corresponding to a CSI parameter having a lower priority.

In other embodiments of the present disclosure, before determining, according to the priority of the CSI parameter, each CSI parameter in the CSI parameter set transmitted by the second communication node and the time-frequency resource position where the second communication node transmits the CSI parameter set, the method further includes the following steps.

A time-frequency resource position of a second uplink control channel parameter is determined according to first signaling configured by itself. The first signaling includes physical layer signaling, and/or higher layer signaling, and the second uplink control channel parameter includes, but is not limited to, one of: an acknowledgement (ACK), a negative acknowledgement (NACK), a scheduling request (SR), or a buffer status report (BSR). Additionally/alternatively A priority of a second uplink control signaling parameter is not lower than a priority of any one of a first-type CSI parameter and a second-type CSI parameter.

In other embodiments of the present disclosure, when the received CSI parameter includes RSRP(s) and the RSRP(s) includes first-level RSRP(s) and second-level RSRP(s), the step of feeding back a parameter value corresponding to the CSI parameter on the time-frequency resource position includes:

feeding back the first-level RSRP(s) through physical layer signaling; and transmitting the second-level RSRP(s) through a media access control element (MAC CE); or transmitting the first-level RSRP(s) and the second-level RSRP(s) through the physical layer signaling.

In other embodiments of the present disclosure, the second-level RSRP is determined by the first-level RSRP, i.e., the second-level RSRP is determined according to the first-level RSRP, the first-level RSRP includes, but is not limited to, an average value of each RSRP group, a maximum value of each RSRP group, a first element of each RSRP group, a maximum element of each RSRP group, a minimum element of each RSRP group, a last element of each RSRP group.

In implementation process, the second-level RSRP may be determined according to the first-level RSRP in the following manners.

The second-level RSRP is determined according to the first-level RSRP and an offset of the first-level RSRP.

Alternatively, the second-level RSRP is determined according to the first-level RSRP and a differential of the first-level RSRP.

Alternatively, when the first-level RSRP corresponds to a beam with a beam group index of 1, it is determined that the RSRP other than the first-level RSRP is the second-level RSRP.

In other embodiments, the second-level RSRP indicates the differential or the offset of the first-level RSRP.

In other embodiments of the present disclosure, the CSI parameter received on the time-frequency resource position has been jointly encoded by the second communication node. The second communication node performs the joint encoding on at least one of the following CSI parameters: performing the joint encoding on at least two first-level RSRPs; performing the joint encoding on one or more first-level RSRPs and the CRI1; performing the joint encoding on the CRI1 and the CRI2; performing the joint encoding on the CRI2 and the RI; performing the joint encoding on any two or more of: the CRI1, the beam group index, the beam index, or the port index; or performing the joint encoding on any two or more of: the RI, the amplitude information of the linear combination codebook, the phase information of the linear combination codebook, or the beam information of the linear combination codebook.

In the channel state information reception method provided by the embodiment of the present disclosure, the first communication node determines the priority of the CSI parameter in the CSI parameter set firstly, determines, according to the priority of the CSI parameter, the CSI parameter transmitted by the second communication node and the time-frequency resource position where the second communication node transmits the CSI parameter, and receives, on the time-frequency resource position, the CSI parameter transmitted by the second communication node. In this way, the priority relationship between newly introduced CSI parameters and CSI parameters related to the original Release 13 and the priority relationship of the newly introduced CSI parameters are determined, so that time-frequency resource position where the CSI parameters is fed back is determined according to these priority relationships, thereby improving accuracy of channel state information transmission and system performance.

Embodiment Seven

Figure 5:
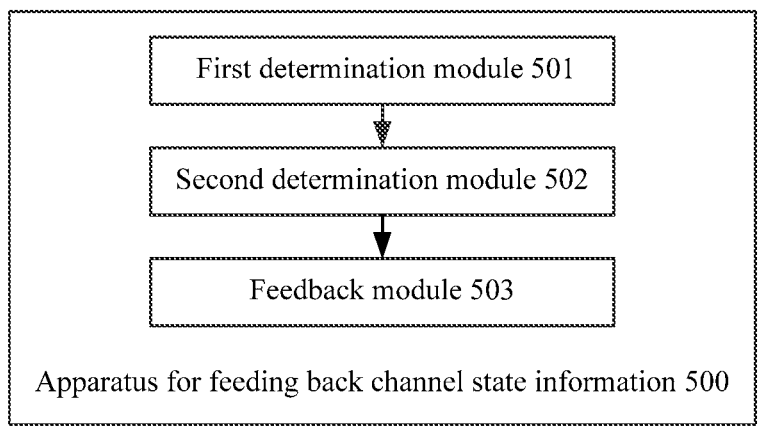
FIG. 5 is a structural diagram of an apparatus for feeding back channel state information according to an embodiment of the present disclosure.

An embodiment of the present disclosure provides an apparatus for feeding back channel state information. FIG. 5 is a structural diagram of the apparatus for feeding back channel state information according to an embodiment of the present disclosure. As shown in FIG. 5, the apparatus includes a first determination module 501, a second determination module 502, and a feedback module 503.

The first determination module 501 is configured to determine a priority of a channel state information (CSI) parameter in a CSI parameter set.

In the embodiment of the present disclosure, the first determination module 501 includes: a first determination unit, or a second determination unit, or a third determination unit.

The first determination unit is configured to automatically determine the priority of the CSI parameter to be fed back according to the request of the first communication node.

The second determination unit is configured to determine the priority of the CSI parameter according to received higher layer signal and/or physical layer signaling carrying a priority relationship.

The third determination unit is configured to determine the priority of the CSI parameter according to a preset rule pre-agreed by the third determination unit and the first communication node.

The second determination module 502 is configured to determine a CSI parameter to be fed back and a time-frequency resource position for feeding back the CSI parameter according to the priority of the CSI parameter.

The feedback module 503 is configured to feed back the CSI parameter to be fed back on the time-frequency resource position.

In other embodiments of the present disclosure, the second determination module 502 includes: a first division unit, a fifth determination unit, and a sixth determination unit.

The first division unit is configured to divide parameters in the CSI parameter set into C1 CSI parameter subsets.

The fifth determination unit is configured to determine, from the C1 CSI parameter subsets, C2 CSI parameter subsets having highest priorities as a set of CSI parameters to be fed back, where a priority of the CSI parameter subset is determined by the priority of a CSI parameter having the highest CSI priority in the CSI parameter subsets; C1 and C2 are positive integers, and C2 is less than and equal to C1. The CSI parameters to be fed back are part or all of CSI parameters in the CSI parameter set.

The sixth determination unit is configured to determine time-frequency resource position of the CSI parameter according to the first signaling received from the first communication node and the priority of the CSI parameter to be fed back. The first signaling includes physical layer signaling and/or higher layer signaling. The first signaling at least carries one of: a demodulation reference signal (DMRS) pattern, a number of Layers, a multiple-input multiple-output (MIMO) mode, a time unit structure, a subcarrier type, a system bandwidth size, a carrier frequency modulation mode, a number of symbols occupied by a DMRS, a start position of a data shared channel, a sending time length of the data shared channel, or an orthogonal cover code (OCC) of the DMRS.

In other embodiments of the present disclosure, the time-frequency resource position is a relative time-frequency resource position of the CSI parameter relative to the DMRS, and the process of determining the time-frequency resource position of the CSI parameter according to the priority of the CSI parameter fed back to the first communication node is as follows.

For a same carrier, if $N1<N2$, a priority of a CSI parameter on a ith symbol is not lower than a priority of a CSI parameter on a jth symbol; if $N1>N2$, the priority of the CSI parameter on the ith symbol is not higher than the priority of the CSI parameter on the jth symbol; if $N1=N2$ and $i<j$, the priority of the CSI parameter on the ith symbol is not lower than the priority of the CSI parameter on the jth symbol; and if $N1=N2$ and $i>j$, the priority of the CSI parameter on the ith symbol is not higher than the priority of the CSI parameter on the jth symbol.

N1 is a minimum value of a first index difference set, and the first index difference set is composed of absolute values of differences between the symbol index of the ith symbol and symbol indexes of Nd symbols on which the DMRS is located. N2 is a minimum value of a second index difference set, and the second index difference set is composed of absolute values of differences between the symbol index of the jth symbol and symbol indexes of the Nd symbols on which the DMRS is located, i and j are non-negative integers less than Ns, Nd is a positive integer less than Ns, and Ns is the number of symbols in one subframe. Another method for obtaining N1 and N2 or description method of N1 and N2 is N1=min(|k−i|) and N2=min (|k−j|). k, j are non-negative integers smaller than Ns, k is the symbol index of one or more symbols on which the DMRS is located, |c| denotes an absolute value of c, and min(C) denotes a minimum value of a set C.

Additionally/Alternatively

For different carriers on a same carrier, a priority of a CSI parameter transmitted on an m1th carrier is not lower than that of a CSI parameter transmitted on an m2th carrier, where m1<m2, and m1 and m2 are positive integers.

In other embodiments of the present disclosure, the second determination unit 502 may further include: a seventh determination unit and an eighth determination unit.

The seventh determination unit is configured to determine, according to a DMRS pattern, a symbol ordered set for transmitting the CSI parameter.

The eighth determination unit is configured to determine, according to the priority of the CSI parameter to be fed back, a mapping relationship between the CSI parameter to be fed back and symbols in the symbol ordered set for transmitting the CSI parameter, where an element index value in an ordered set corresponding to a CSI parameter having a higher priority is lower than an element index value in an ordered set corresponding to a CSI parameter having a lower priority.

In other embodiments of the present disclosure, the apparatus further includes: a first acquisition module and a fifth determination module.

The first acquisition module is configured to acquire the CSI parameter included in the CSI parameter set through receiving higher layer signaling configured by the first communication node.

The fifth determination module is configured to determine a time-frequency resource position of a second uplink control channel parameter according to first signaling received from the first communication node, where the first signaling includes physical layer signaling and/or higher layer signaling. The second uplink control channel parameter includes, but is not limited to one of: an acknowledgement (ACK), a negative acknowledgement (NACK), a scheduling request (SR), or a buffer status report (BSR). Additionally/alternatively, a priority of the second uplink control signaling parameter is not lower than a priority of either of a first-type CSI parameter and a second-type CSI parameter.

The CSI parameter fed back to the first communication node includes the RSRP, and the RSRP includes the first-level RSRP and the second-level RSRP. The feedback module 503 includes: a first feedback unit, a second feedback unit, and a ninth determination unit.

The first feedback unit is configured to feed back a parameter value of the first-level RSRP through the physical layer signaling.

The second feedback unit is configured to transmit the parameter value of the second-level RSRP through an MAC control element (MAC CE);

The ninth determination unit is configured to determine the second-level RSRP according to the first-level RSRP, where the first-level RSRP includes, but is not limited to an average value of each RSRP group, a maximum value of each RSRP group, a first element of each RSRP group, a maximum element of each RSRP group, a minimum element of each RSRP group, a last element of each RSRP group.

In other embodiments of the present disclosure, the ninth determination unit is further configured to determine the second-level RSRP according to the first-level RSRP and an offset of the first level RSRP.

Alternatively, the ninth determination unit is further configured to determine the second-level RSRP according to the first-level RSRP and a differential of the first-level RSRP. Alternatively, when the first-level RSRP corresponds to a beam with a beam group index of 1, the ninth determination unit determines a RSRP other than the first-level RSRP as the second-level RSRP.

In other embodiments, the second-level RSRP represents the differential or the offset of the first-level RSRP.

In other embodiments of the present disclosure, the apparatus further includes: an encoding module.

The encoding module is configured to perform joint encoding on the CSI parameter, where the joint encoding is performed on at least one of the following CSI parameters: performing joint encoding on at least two first-level RSRPs; performing joint encoding on one or more first-level RSRPs and the CRI1; performing joint encoding on the CRI1 and the CRI2; performing joint encoding on the CRI2 and the RI; performing joint encoding on any two or more of: the CRI1, the beam group index, the beam index, the port index; or performing joint encoding on any two or more of: the RI, the amplitude information of the linear combination codebook, the phase information of the linear combination codebook, or the beam information of the linear combination codebook.

Here, it needs to be noted that the above description of the channel state information feedback apparatus embodiment is similar to the description of the channel state information feedback method embodiment described above, and has similar beneficial effects as the method embodiment, which will not be repeated here. For technical details not disclosed in the channel state information feedback apparatus embodiment of the present disclosure, reference may be made to the description of the channel state information feedback method embodiment of the present disclosure for understanding.

Embodiment Eight

Figure 6:
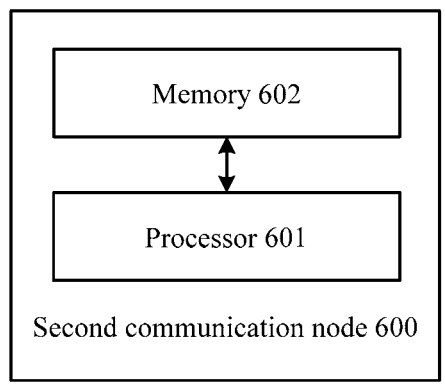
FIG. 6 is a structural diagram of a second communication node according to an embodiment of the present disclosure.

The embodiment of the present disclosure provides a second communication node. FIG. 6 is a structural diagram of a second communication node according to an embodiment of the present disclosure. As shown in FIG. 6, the second communication node 600 at least includes: a processor 601 and a memory 602 storing executable instructions.

The processor 601 is configured to execute the stored executable instructions, and the executable instructions include:

determining a priority of a channel state information (CSI) parameter in a CSI parameter set;

determining a CSI parameter to be fed back and a time-frequency resource position for feeding back the CSI parameter according to the priority of the CSI parameter; and feeding back the CSI parameter to be fed back on the time-frequency resource position.

In other embodiments of the present disclosure, before executing the instruction of determining the priority of the CSI parameter in the CSI parameter set, the processor is configured to acquire the CSI parameters included in the CSI parameter set through receiving higher layer signaling configured by the first communication node.

In other embodiments of the present disclosure, determining the priority of the CSI parameter in the CSI parameter set includes:

determining the priority of the CSI parameter automatically according to a preset rule; or determining the priority of the CSI parameter according to received higher layer signal and/or physical layer signaling carrying a priority relationship; or determining the priority of the CSI parameter according to the preset rule pre-agreed by the second communication node and the first communication node. It is to be noted that, the content included in the CSI parameter in the embodiment of the present disclosure, and the determination of the priority relationship of the CSI parameter is the same as the priority relationship specified in A.1), A.2) and A.3) provided in other embodiments of the present disclosure.

In other embodiments of the present disclosure, determining the CSI parameter to be fed back according to the priority of the CSI parameter includes:

dividing parameters in the CSI parameter set into C1 CSI parameter subsets;

determining, from the C1 CSI parameter subsets, C2 CSI parameter subsets having highest priorities as a set of CSI parameters to be fed back, where a priority of the CSI parameter subset is determined by the priority of the CSI parameter having the highest CSI priority in the CSI parameter subsets; C1 and C2 are positive integers, and C2 is less than and equal to C1. The CSI parameters to be fed back are part or all of CSI parameters in the CSI parameter set.

In other embodiments of the present disclosure, the step of determining the time-frequency resource position of the CSI parameter to be fed back according to the priority of the CSI parameter is as follows.

The time-frequency resource position of the CSI parameter is determined according to first signaling sent by the first communication node and the priority of the CSI parameter to be fed back, where the first signaling includes physical layer signaling and/or higher layer signaling.

The first signaling at least carries one of: a demodulation reference signal (DMRS) pattern, a number of Layers, a multiple-input multiple-output (MIMO) mode, a time unit structure, a subcarrier type, a system bandwidth size, a carrier frequency modulation mode, a number of symbols occupied by a DMRS, a start position of a data shared channel, a sending time length of the data shared channel, or an orthogonal cover code (OCC) of the DMRS.

In other embodiments of the present disclosure, the time-frequency resource position is a relative time-frequency resource position of the CSI parameter relative to a DMRS, and the process of determining the time-frequency resource position of the CSI parameter according to the priority of the CSI parameter fed back by the first communication node includes the following step.

For a same carrier, if N1<N2, a priority of a CSI parameter on a ith symbol is not lower than a priority of a CSI parameter on a jth symbol; if N1>N2, the priority of the CSI parameter on the ith symbol is not higher than the priority of the CSI parameter on the jth symbol; if N1=N2 and i<j, the priority of the CSI parameter on the ith symbol is not lower than the priority of the CSI parameter on the jth symbol; if N1=N2 and i>j, the priority of the CSI parameter on the ith symbol is not higher than the priority of the CSI parameter on the jth symbol.

N1 is a minimum value of a first index difference set, and the first index difference set is composed of absolute values of differences between the symbol index of the ith symbol and symbol indexes of Nd symbols on which the DMRS is located. N2 is a minimum value of a second index difference set, and the second index difference set is composed of absolute values of differences between the symbol index of the jth symbol and symbol indexes of the Nd symbols on which the DMRS is located, i and j are non-negative integers less than Ns, Nd is a positive integer less than Ns, and Ns is a number of symbols in one subframe. Another method for obtaining N1 and N2 or description method of N1 and N2 is N1=min(|k−i|) and N2=min (|k−j|). i, k, j are non-negative integers smaller than Ns, k is one or more symbol indexes of the symbol in which the DMRS is located, |c| denotes an absolute value of c, and min(C) denotes a minimum value of a set C.

Additionally/Alternatively

For different carriers on a same symbol, a priority of a CSI parameter transmitted on an m1th carrier is not lower than that of a CSI parameter transmitted on an m2th carrier, wherein m1<m2, and m1 and m2 are positive integers.

In other embodiments of the present disclosure, the process of determining the time-frequency resource position of the CSI parameter according to the priority of the CSI parameter fed back by the first communication node further includes:

determining a symbol ordered set for transmitting the CSI parameter according to a DMRS pattern;

determining a mapping relationship between the CSI parameter to be fed back and symbols in the symbol ordered set for transmitting the CSI parameter according to the priority of the CSI parameter to be fed back, where an element index value in an ordered set corresponding to a CSI parameter having a higher priority is smaller than an element index value in an ordered set corresponding to a CSI parameter having a lower priority.

In other embodiments of the present disclosure, before executing the instruction of determining the CSI parameter to be fed back and the time-frequency resource position for feeding back the CSI parameter according to the priority of the CSI parameter, the process is further configured to execute the following instruction.

A time-frequency resource position of a second uplink control channel parameter is determined according to first signaling sent by a first communication node, where the first signaling includes physical layer signaling and/or higher layer signaling. The second uplink control channel parameter includes, but is not limited to, one of: an acknowledgement (ACK), a negative acknowledgement (NACK), a scheduling request (SR), or a buffer status report (BSR). Additionally/alternatively, a priority of a second uplink control signaling parameter is not lower than a priority of either of a first-type CSI parameter and a second-type CSI parameter.

In other embodiments of the present disclosure, when the CSI parameter to be fed back includes RSRP(s) and the RSRP(s) includes first-level RSRP(s) and second-level RSRP(s), the process of feeding back the CSI parameter to be fed back on the time-frequency resource position is as follows.

The first-level RSRP is fed back through physical layer signaling, and the second-level RSRP is transmitted through a media access control element (MAC CE).

Alternatively, the first-level RSRP and the second-level RSRP are transmitted through the physical layer signaling.

In other embodiments of the present disclosure, the second-level RSRP is determined by the first-level RSRP, i.e., the second-level RSRP is determined according to the first-level RSRP. The first-level RSRP includes, but is not limited to, an average value of each RSRP group, a maximum value of each RSRP group, a first element of each RSRP group, a maximum element of each RSRP group, a minimum element of each RSRP group, a last element of each RSRP group.

In other embodiments of the present disclosure, the process of determining the second-level RSRP according to the first-level RSRP further is as follows.

The second-level RSRP is determined according to the first-level RSRP and an offset of the first-level RSRP. Alternatively, the second-level RSRP is determined according to the first-level RSRP and a differential of the first-level RSRP. Alternatively, when the first-level RSRP is a RSRP corresponding to a beam with a beam group index of 1, it is determined that a RSRP other than the first-level RSRP is the second-level RSRP.

In other embodiments, the second-level RSRP represents the differential or the offset of the first-level RSRP.

In other embodiments of the present disclosure, before executing the instruction of feeding back the CSI parameter on the time-frequency resource position, the processor is further configured to execute the instruction of perform joint encoding on the CSI parameter.

The joint encoding is performed on at least one of the following CSI parameters. The joint encoding is performed on at least two first-level RSRPs; the joint encoding is performed on one or more first-level RSRPs and the CRI1; the joint encoding is performed on the CRI1 and the CRI2; the joint encoding is performed on the CRI2 and the RI; the joint encoding is performed on any two or more of the CRI1, the beam group index, the beam index, or the port index; and the joint encoding is performed on any two or more of the RI, the amplitude information of the linear combination codebook, the phase information of the linear combination codebook, or the beam information of the linear combination codebook.

Correspondingly, an embodiment of the present disclosure provides a computer storage medium storing computer-executable instructions. The computer-executable instructions are configured to execute the channel state information feedback method.

It should be understood that "one embodiment" or "an embodiment" mentioned throughout the specification means that a particular feature, structure or characteristic related to the embodiments is included in at least one embodiment of the present disclosure. Therefore, the appearance of the phrase "in one embodiment" or "in an embodiment" in various places throughout the specification is not necessarily referring to the same embodiment. In addition, these particular features, structures or characteristics may be combined in one or more embodiments in any suitable manner. It should be understood that in various embodiments of the present disclosure, the serial numbers of the above processes do not mean the execution order, which should not limit the implementation processes of the present disclosure in any improper way. The execution order of the above processes should be determined according to their functions and internal logics. The serial numbers of the embodiments described above of the present disclosure are merely for ease of description and do not indicate superiority and inferiority of the embodiments.

It is to be noted that as used herein, the term "comprising", "including" or any other variant thereof is intended to encompass a non-exclusive inclusion so that a process, method, article or apparatus that includes a series of elements not only includes the expressly listed elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

It should be understood that the devices and the methods disclosed in the embodiments of the present application may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the embodiments of the present disclosure.

Moreover, various function units in the embodiments of the present disclosure may all be integrated in one processing unit, or each unit may be used as a separate unit, or two or more units may be integrated into one unit. The integrated function unit may be implemented by hardware or may be implemented by hardware plus a software function unit.

It may be understood by those skilled in the art that all or part of the steps in the method embodiments described above may be implemented by hardware related to program instructions, these programs may be stored in a computer-readable storage medium, and, when executed, these programs execute steps including the method embodiments described above; and the preceding storage medium includes various media capable of storing program codes, such as a removable storage device, a read-only memory (ROM), a magnetic disk or an optical disk.

The above are only embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

INDUSTRIAL APPLICABILITY

In the embodiment of the present disclosure, the priority of the CSI parameter in the CSI parameter set is firstly determined, the CSI parameter to be fed back and the time-frequency resource position for feeding back the CSI parameter are determined according to the priority of the CSI parameter, and the CSI parameter to be fed back is fed back on the time-frequency resource position. In this way, the priority relationship between newly introduced CSI parameters and CSI parameters related to the original Release 13 and the priority relationship of the newly introduced CSI parameters are determined, so that time-frequency resource position for feeding back the CSI parameters is determined according to these priority relationships, thereby improving accuracy of channel state information transmission and system performance.

What is claimed is:

1. A method for wireless communication, comprising:
   determining, by a user device, a first reference signal received power (RSRP) value, wherein the first RSRP value is a maximum measured value of a RSRP group;
   determining, by the user device, a second RSRP value based a differential of the first RSRP value; and
   reporting the first RSRP value and the second RSRP value to a base station.

2. The method of claim 1, wherein the first RSRP value and the second RSRP value are reported in a physical layer.

3. The method of claim 1, further comprising:
   reporting channel state information to the base station, wherein the channel state information comprises at least one of: a channel quality indicator (CQI), a precoding matrix indicator (PMI), a channel state information (CSI) reference signal (RS) resource indicator, or a rank indication (RI).

4. A method for wireless communication, comprising:
   receiving, by a base station, a first reference signal received power (RSRP) value and a second RSRP value from a user device, wherein the first RSRP value is a maximum measured value of a RSRP group, and wherein the second RSRP value is based a differential of the first RSRP value; and
   determining, by the base station, a reference signal received power according to the first RSRP value and the second RSRP value.

5. The method of claim 4, wherein the first RSRP value and the second RSRP value are received in a physical layer.

6. The method of claim 4, further comprising:
   receiving channel state information from the user device, wherein the channel state information comprises at least one of: a channel quality indicator (CQI), a precoding matrix indicator (PMI), a channel state information (CSI) reference signal (RS) resource indicator, or a rank indication (RI).

7. An apparatus for wireless communications, comprising:
   a processor; and
   a memory including processor-executable instructions stored thereon, the processor-executable instructions upon execution by the processor configures the processor to:
   determine a first reference signal received power (RSRP) value, wherein the first RSRP value is a maximum measured value of a RSRP group;
   determine a second RSRP value based a differential of the first RSRP value; and
   reporting the first RSRP value and the second RSRP value to a base station.

8. The apparatus of claim 7, wherein processor is configured to report the first RSRP value and the second RSRP value in a physical layer.

9. The apparatus of claim 7, wherein processor is configured to report channel state information to the base station, the channel state information comprising at least one of: a channel quality indicator (CQI), a precoding matrix indicator (PMI), a channel state information (CSI) reference signal (RS) resource indicator, or a rank indication (RI).

10. An apparatus for wireless communications, comprising:
    a processor; and
    a memory including processor-executable instructions stored thereon, the processor-executable instructions upon execution by the processor configures the processor to:
    receive a first reference signal received power (RSRP) value and a second RSRP value from a user device, wherein the first RSRP value is a maximum measured value of a RSRP group, and wherein the second RSRP value is based a differential of the first RSRP value; and
    determine a reference signal received power according to the first RSRP value and the second RSRP value.

11. The apparatus of claim 10, wherein the processor is configured to receive the first RSRP value and the second RSRP value in a physical layer.

12. The apparatus of claim 10, wherein the processor is configured to receive channel state information from the user device, the channel state information comprising at least one of: a channel quality indicator (CQI), a precoding matrix indicator (PMI), a channel state information (CSI) reference signal (RS) resource indicator, or a rank indication (RI).

13. A non-transitory computer readable storage medium storing computer readable code, the code, when executed by a processor, causing the processor to implement a method that comprises:
    determining, by a user device, a first reference signal received power (RSRP) value, wherein the first RSRP value is a maximum measured value of a RSRP group;
    determining, by the user device, a second RSRP value based a differential of the first RSRP value; and
    reporting the first RSRP value and the second RSRP value to a base station.

14. The non-transitory computer readable storage medium of claim 13, wherein the first RSRP value and the second RSRP value are reported in a physical layer.

15. The non-transitory computer readable storage medium of claim 13, wherein code, when executed by the processor, causes the processor to:
    report channel state information to the base station, wherein the channel state information comprises at least one of: a channel quality indicator (CQI), a precoding matrix indicator (PMI), a channel state information (CSI) reference signal (RS) resource indicator, or a rank indication (RI).

16. A non-transitory computer readable storage medium storing computer readable code, the code, when executed by a processor, causing the processor to implement a method that comprises:
    receiving, by a base station, a first reference signal received power (RSRP) value and a second RSRP value from a user device, wherein the first RSRP value is a maximum measured value of a RSRP group, and wherein the second RSRP value is based a differential of the first RSRP value; and
    determining, by the base station, a reference signal received power according to the first RSRP value and the second RSRP value.

17. The non-transitory computer readable storage medium of claim 16, wherein the first RSRP value and the second RSRP value are received in a physical layer.

18. The non-transitory computer readable storage medium of claim 16, wherein code, when executed by the processor, causes the processor to:

receive channel state information from the user device, wherein the channel state information comprises at least one of: a channel quality indicator (CQI), a precoding matrix indicator (PMI), a channel state information (CSI) reference signal (RS) resource indicator, or a rank indication (RI).

* * * * *